COIN SORTER AND COMPUTER

Filed Feb. 13, 1956 10 Sheets-Sheet 1

INVENTORS
Arnold R. Buchholz
Frank Haban
Ray A. Weeks
BY Inarles & French
Att'ys.

INVENTORS
Arnold R. Buchholz
Frank Haban
Ray A. Weeks
BY Inarles & French
Att'ys.

INVENTORS
Arnold R. Buchholz
Frank Haban
Ray A. Weeks
BY
Inarles & French
Attys.

INVENTORS
Arnold R. Buchholz
Frank Haban
Roy A. Weeks
BY Jualers? French
Att'ys.

INVENTORS
Arnold R. Buchholz
Frank Haban
Ray A. Weeks
BY Ivarles & French
Att'ys.

INVENTORS
Arnold R. Buchholz
Frank Haban
Ray A. Weeks
BY
Inarles & French
Att'ys INVENTORS
Arnold R. Buchholz
Frank Haban
Ray A. Weeks
BY Inarles & French
Att'ys.

INVENTORS
Arnold R. Buchholz
Frank Haban
BY Ray A. Weeks
Marks & French
Att'ys

INVENTORS
Arnold R. Buchholz
Frank Haban
Ray A. Weeks
BY
Searles & French
Att'ys.

INVENTORS
Arnold R. Buchholz
Frank Haban
Ray A. Weeks
BY
Searles & French
Att'ys.

United States Patent Office 3,016,191

Patented Jan. 9, 1962

3,016,191
COIN SORTER AND COMPUTER

Arnold R. Buchholz and Frank Haban, Watertown, and Ray A. Weeks, Milwaukee, Wis., assignors to Brandt Automatic Cashier Company, Watertown, Wis., a corporation of Wisconsin Filed Feb. 13, 1956, Ser. No. 565,130
6 Claims. (Cl. 235—92)

The invention relates to a coin totalizer or computer actuated by sorted coin operated switches to indicate the value in dollars and cents of the coins, or token equivalents thereof, that have been or are being sorted.

One object of the invention is to provide a sorted coin value computer which uses relays and switches and avoids the use of vacuum tubes and a multiplicity of mechanical parts whose inherent inertias prevent fast operation.

A further object of the invention is to provide a computer whose design follows a decimal rather than a binary system, that has a digit system from 1 to 5 to count values from one to ten and whenever the value ten or higher is reached carries over to a tens system from 10 to 99 by subtracting the original 5 count from the digit system.

While the present computer may be used with any suitable coin sorter equipped with switches operable by the sorted coin, a further object is to provide a simple form of coin sorter as hereinafter described.

The invention further consists in the several features hereinafter described and more particularly defined by claims at the conclusion hereof.

Figure 1:
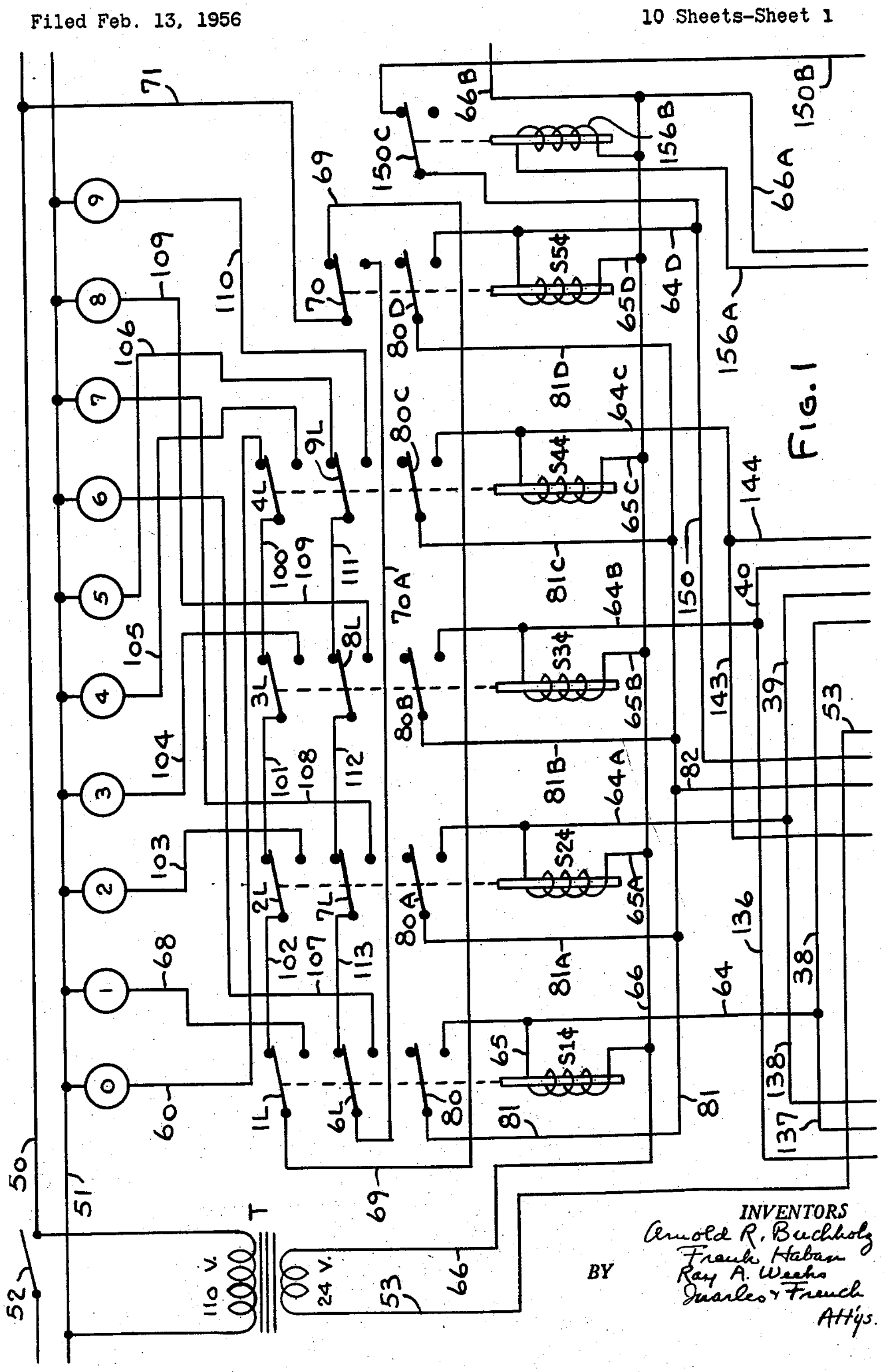
FIGS. 1 to 6 are wiring diagrams of an apparatus embodying the invention that should be read together as indicated by the figure arrangement shown in FIG. 7.
Figure 2:
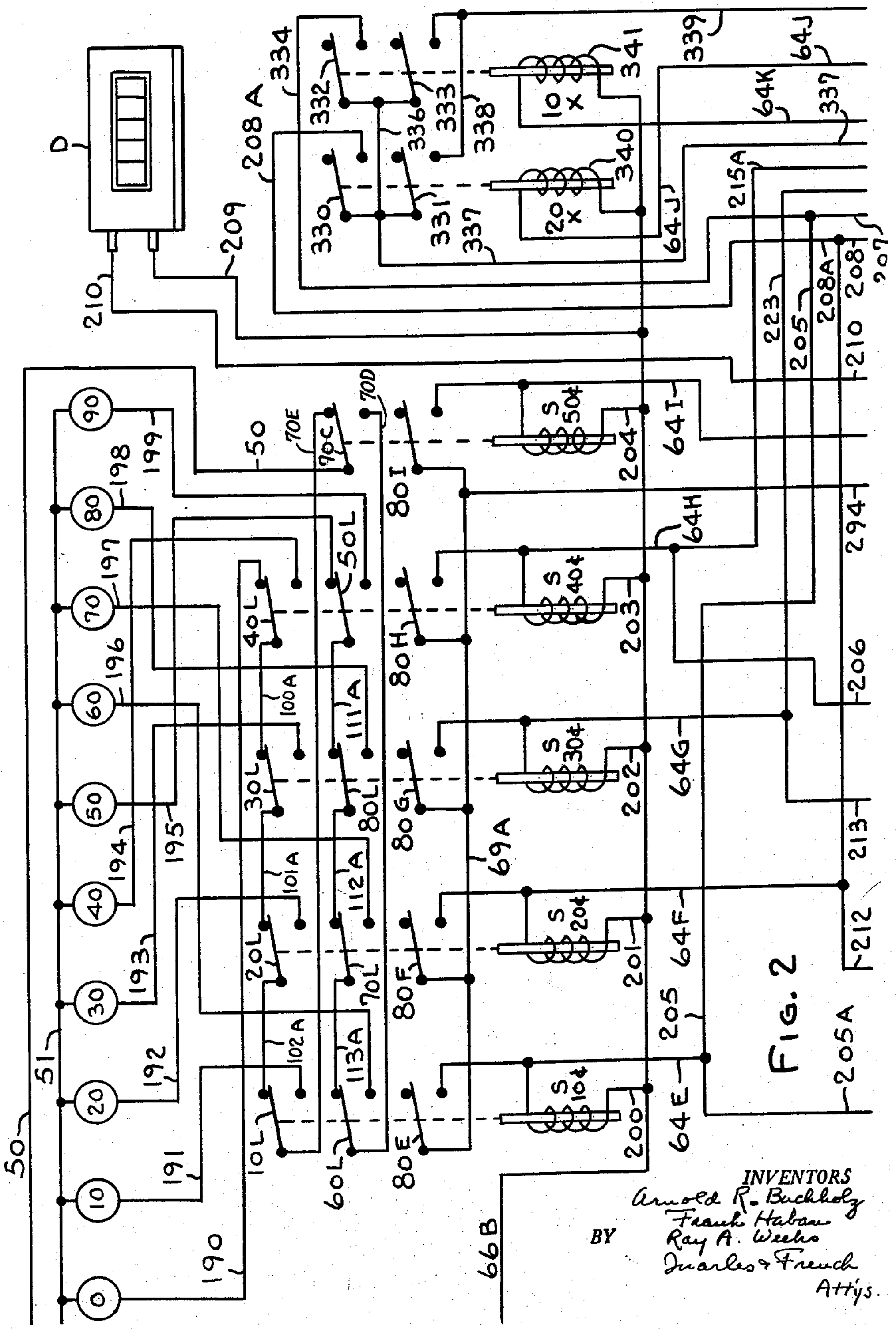
Figure 3:
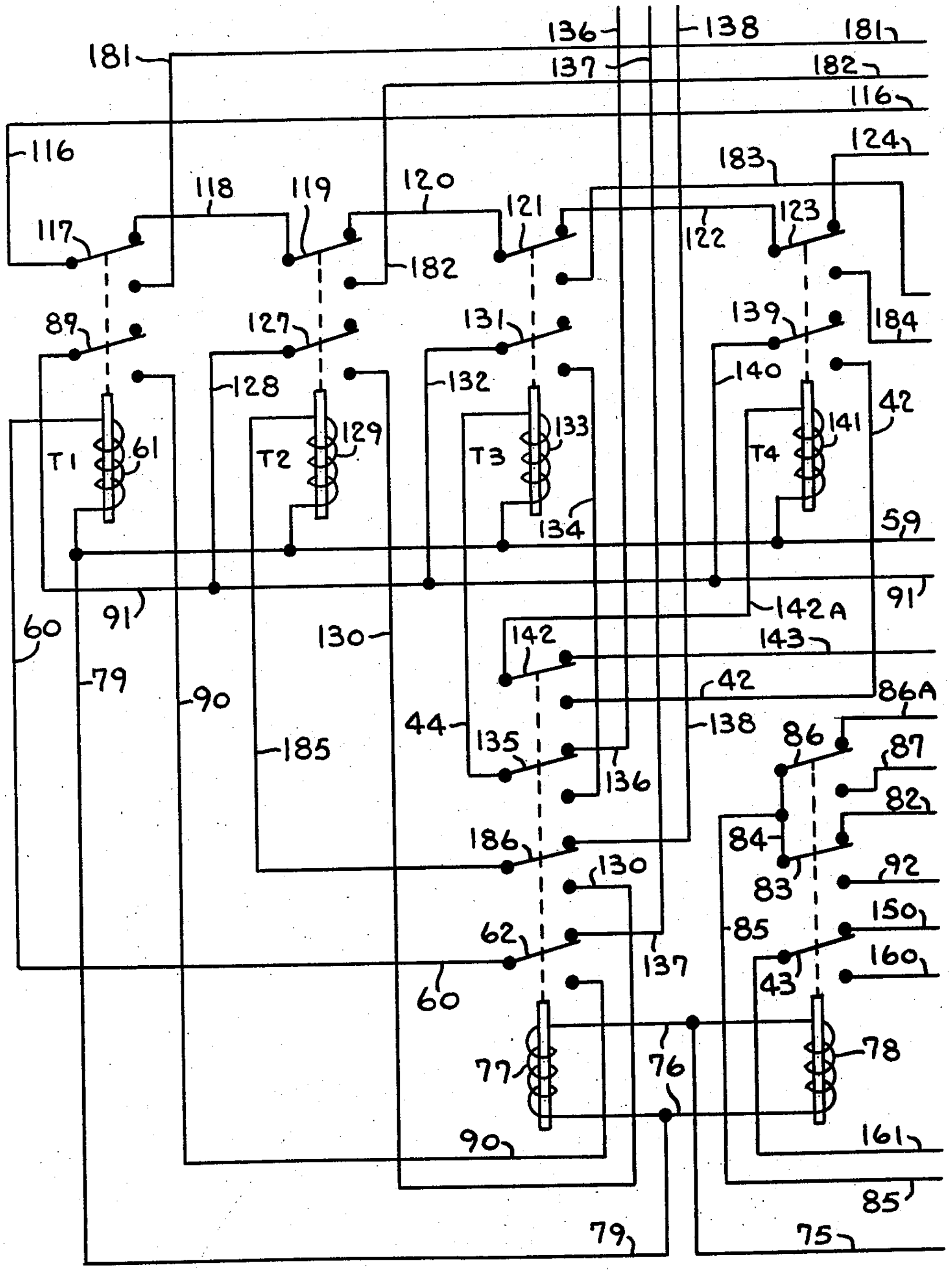
Figure 7:
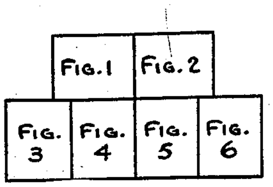
Figure 4:
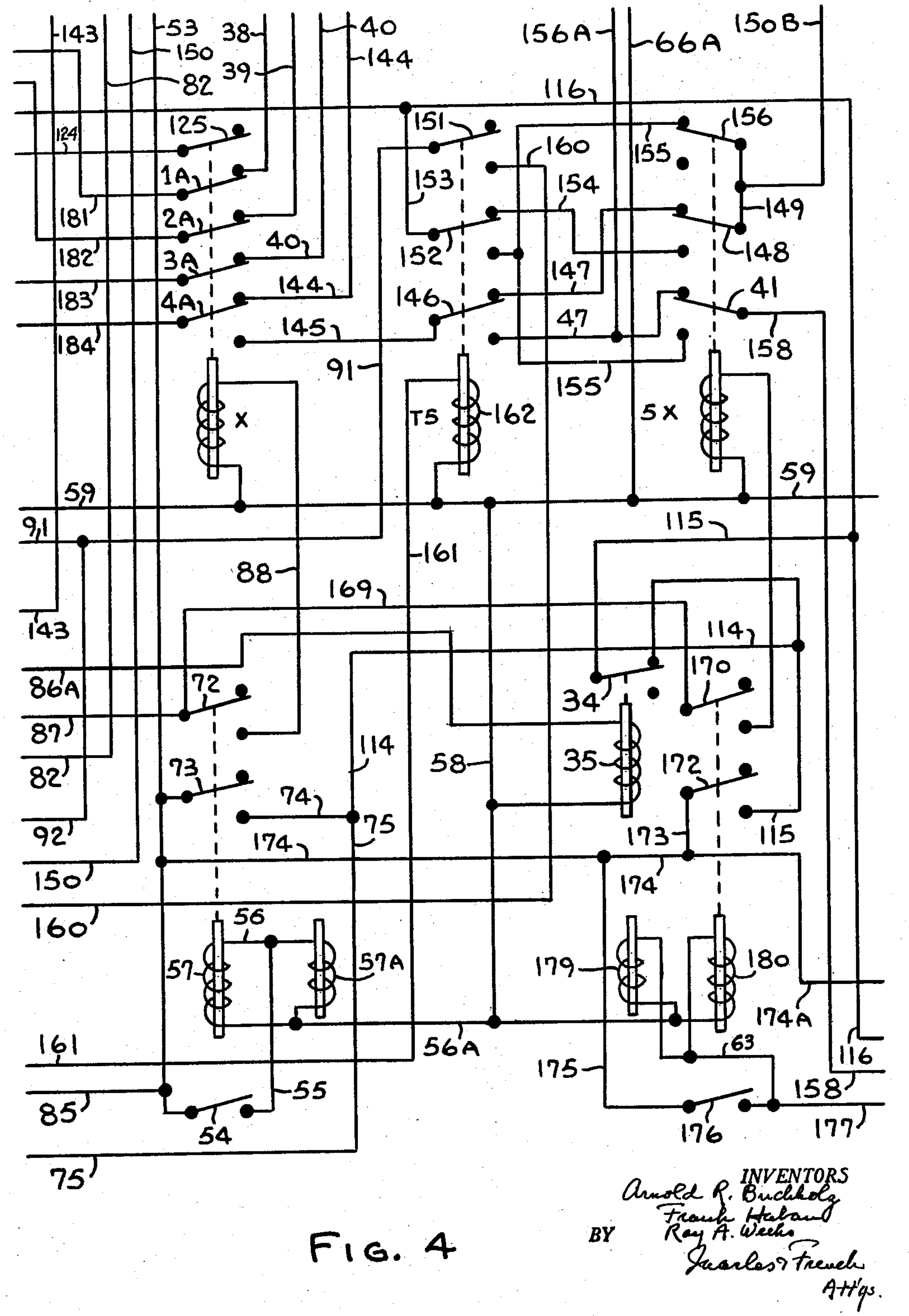
Figure 5:
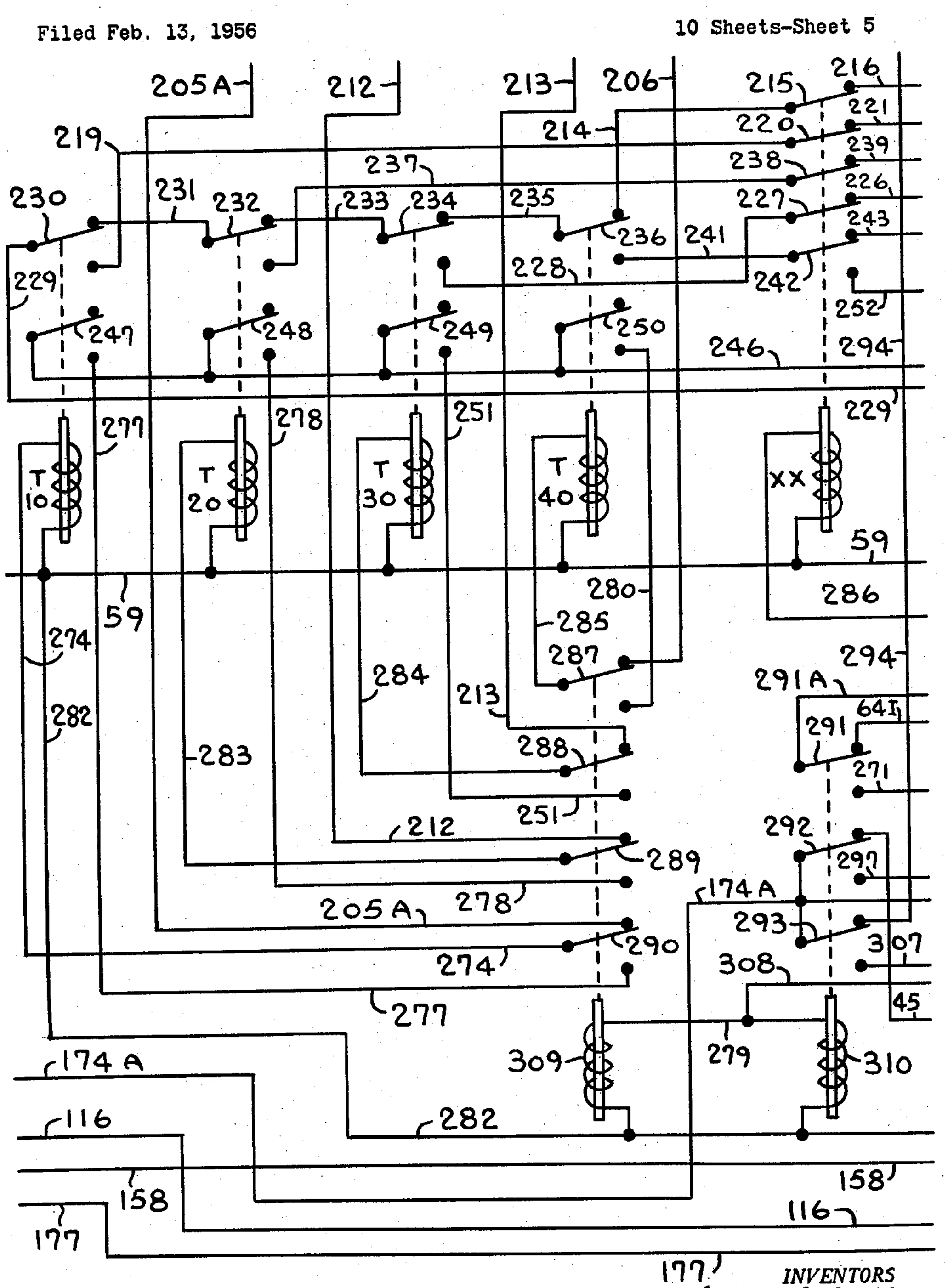
Figure 6:
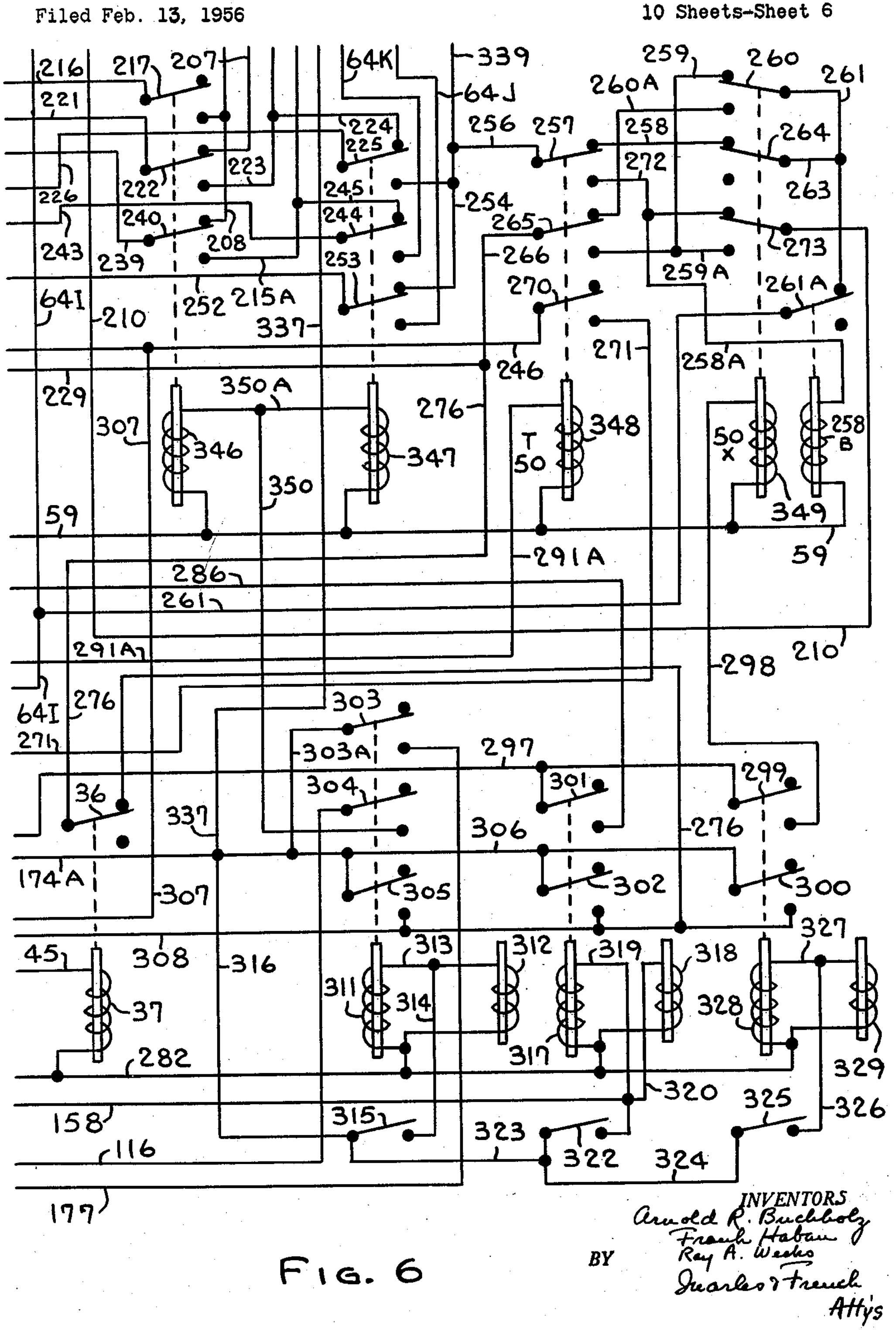
Figure 8:
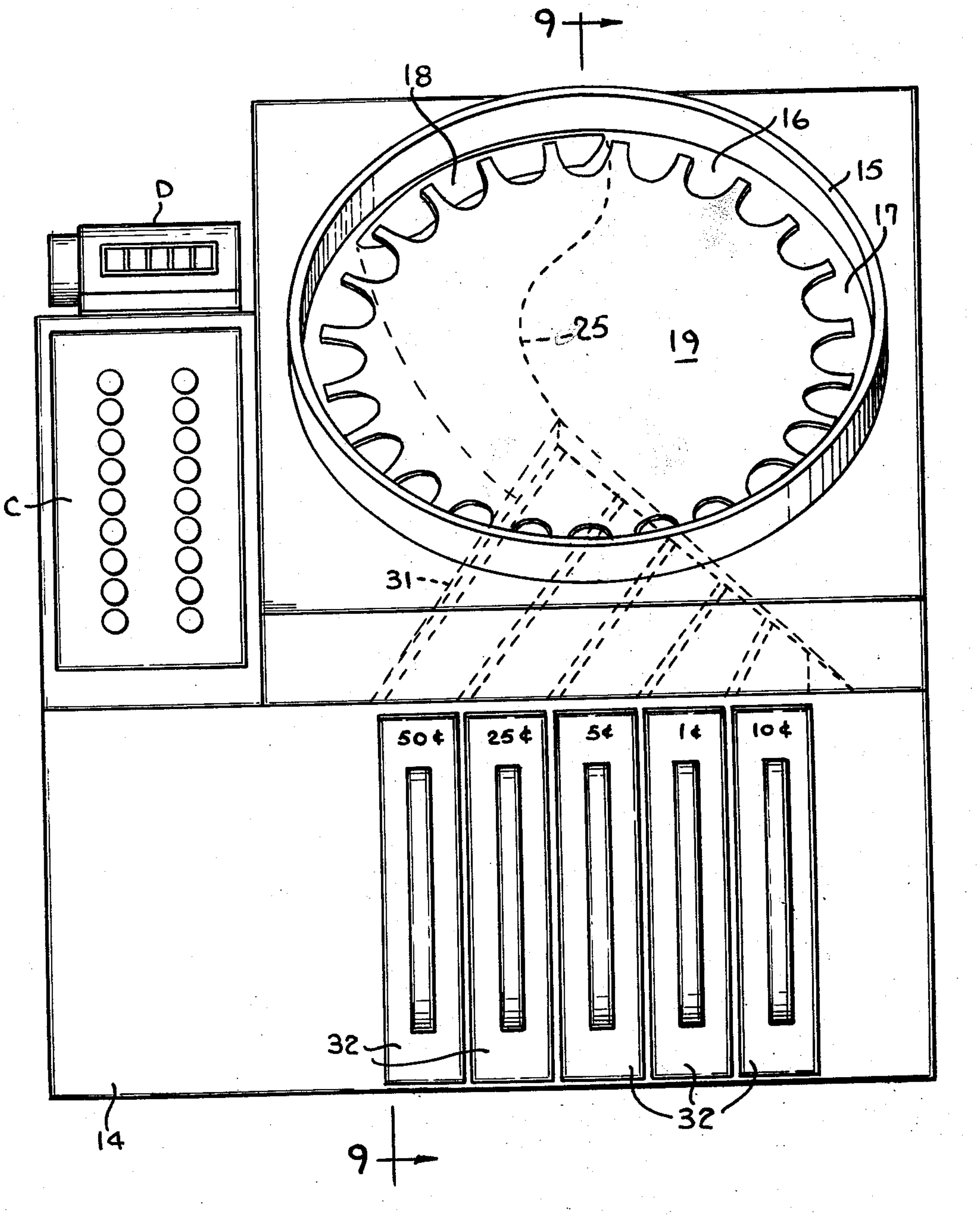
FIG. 8 is a front elevation view of a coin sorter embodying the invention.
Figure 9:
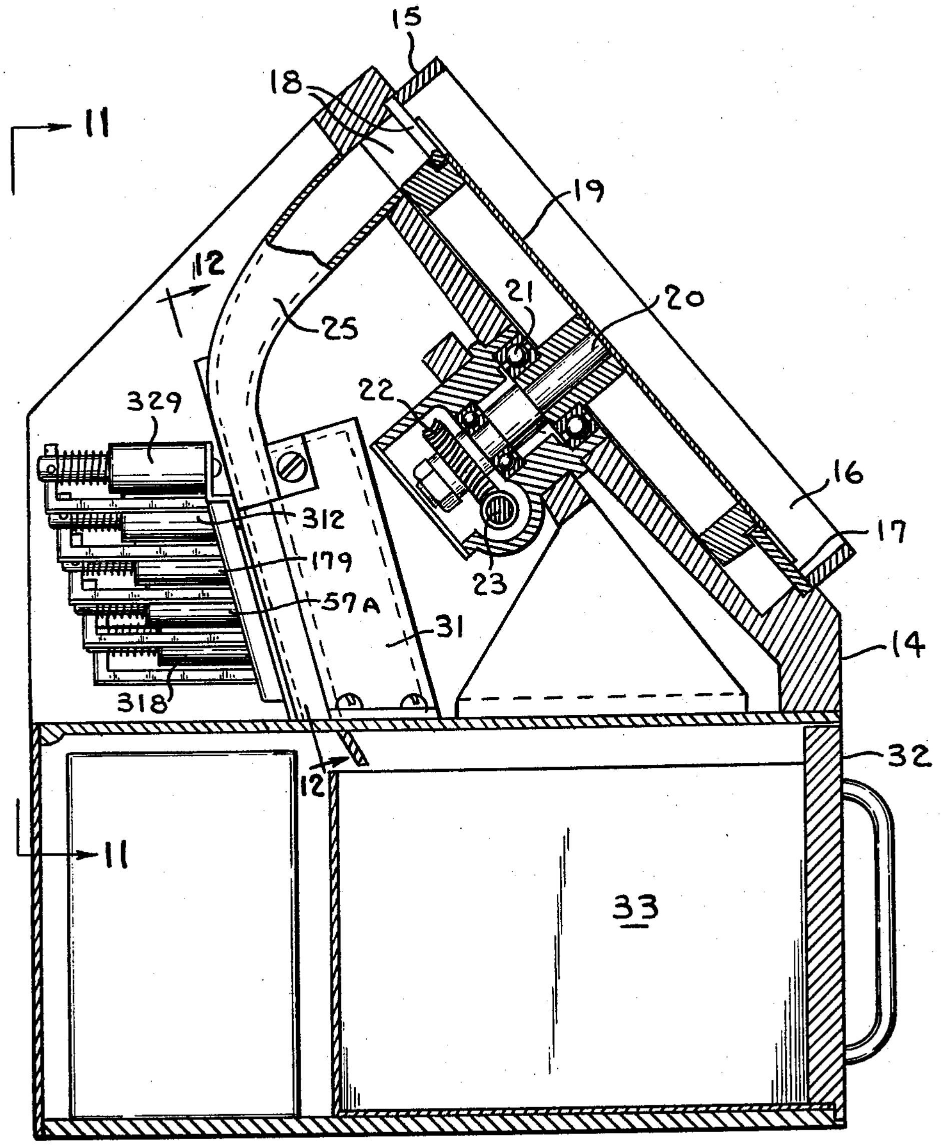
FIG. 9 is a section taken on the broken line 9—9 of FIG. 8.

In FIGS. 1 to 6 the various switches, conductors, and relays have been indicated by letters, numerals, or both, and to avoid repetition, will be referred to as the description of the operation of the circuits are given, bearing in mind that the numerals 50 and 51 are supply wires supplying current to two banks of indicators such as lights 0 to 9 and 0 to 90, and that a transformer T whose primary coil is connected across the lines 50 and 51 supplies current to a secondary coil of lower voltage having a live conductor 53 and a return conductor 66. Conductor 66 has branches 66B and 66A, the branch 66A connecting with a common return 59 for relays hereinafter described. The live wire 53 connects with conductors 174 and 174A.

It is also to be noted that the relays S1¢, S2¢, S3¢, S4¢, S5¢, S10¢, S20¢, S30¢, S40¢, and S50¢ are of the delayed action type in which their armatures (or switches) do not release immediately and that switches 142, 135, 186, 62, 86, 83, 43, 287, 288, 289, 290, 291, 292, and 293 are of the MBB (make before break) type. In this connection the switches 83 and 43 preferably break before switch 86 breaks its initial circuit, and the switches 291 and 293 break before switch 292 breaks its initial circuit.

In order that the detailed description of the various circuits may be more readily understood, a brief description of what these circuits accomplish will be given.

The switches 54, 176, 315, 322, and 325 are switches operated respectively by a cent, a nickel, a quarter, a dime, and a half dollar.

Each time the switch 54 is operated, one of the solenoids controlling the digit indicators 1 to 9 is operated. The first cent operating switch 54 acts to energize relay S1¢ which operates switch 1L to pass current from line 50, conductor 71, switch 70, conductor 69, switch 1L, conductor 68, lamp 1 to return line 51 to light the lamp 1 to indicate one cent. The second cent operating switch 54 acts to cut out relay S1¢ and energize solenoid S2¢ which operates switch 2L to pass current from line 50, conductor 71, switch 70, conductor 69, switch 1L, conductor 102, switch 2L, conductor 103, lamp 2 to return 51 to light the lamp 2 to indicate two cents. The third cent operating switch 54 acts to cut out relay S2¢ and energize relay S3¢ which operates switch 3L to pass current from line 50, conductor 71, switch 70, conductor 69, switch 1L, conductor 102, switch 2L, conductor 101, switch 3L, conductor 104, lamp 3 to return 51 to light lamp 3 to indicate three cents. The fourth cent operating switch 54 acts to cut out relay S3¢ and energize relay S4¢ which operates switch 4L to pass current from line 50, conductor 71, switch 70, conductor 69, switch 1L, conductor 102, switch 2L, conductor 101, switch 3L, conductor 100, switch 4L, conductor 105, lamp 4 to return 51 to light lamp 4 to indicate four cents. The fifth cent operating switch 54 acts to cut out relay S4¢ and energize relay S5¢ which operates switch 70 to pass current from line 50, conductor 71, switch 70, conductor 70A, switch 6L, conductor 113, switch 7L, conductor 112, switch 8L, conductor 111, switch 9L, conductor 106, lamp 5 to return to light lamp 5 and indicate five cents. Relay S5¢ remains energized while the next four cents are indicated. The sixth cent operating switch 54 acts to again energize relay S1¢ to operate switch 6L to pass current from line 50, conductor 71, switch 70, conductor 70A, switch 6L, conductor 107, lamp 6 to return 51 to light lamp 6 to indicate six cents. The seventh cent operating relay switch 54 acts to cut out relay S1¢ and again energize relay S2¢ which operates switch 7L to pass current from line 50, conductor 71, switch 70, conductor 70A, switch 6L, conductor 113, switch 7L, conductor 108, lamp 7 to return 51 to light lamp 7 to indicate seven cents. The eighth cent operating switch 54 acts to cut out relay S2¢ and energize relay S3¢ which operates switch 8L to pass current from line 50, conductor 71, switch 70, conductor 70A, switch 6L, conductor 113, switch 7L, conductor 112, switch 8L, conductor 109, lamp 8 to return 51 to light lamp 8 to indicate eight cents. The ninth cent operating switch 54 acts to cut out relay S3¢ and again energize relay S4¢ which operates switch 9L to pass current from line 50, conductor 71, switch 70, conductor 70A, switch 6L, conductor 113, switch 7L, conductor 112, switch 8L, conductor 111, switch 9L, conductor 110, lamp 9 to return 51 to light lamp 9 to indicate nine cents. A tenth cent operating switch 54 acts to cut out relays S4¢ and S5¢ to restore all the light control switches previously described including switches 70 and 9L so that current from the line 50 passes via conductor 71, switch 70, conductor 69, switch 1L, conductor 102, switch 2L, conductor 101, switch 3L, conductor 100, switch 4L, conductor 60, lamp 0 to return 51 and at the same time shifts the circuit to energize relay 317 which acts to energize relay S10¢ which operates switch 10L to pass current from the line 50, switch 70C, conductor 70E, switch 10L, conductor 191, lamp 10 to return 51 to light lamp 10 to indicate ten cents. The same action occurs if cents are added up to ninety-nine cents, the tens amounts of these cents being progressively indicated by the lighting of the lamps 20, 30, 40, 50, 60, 70, 80, and 90 through the progressive energization of the solenoids S10¢, S20¢, S30¢, S40¢, and S50¢ up to fifty cents and the progressive reenergization of the solenoids S10¢, S20¢, S30¢, and S40¢ while the S50¢ remains energized. For the one hundredth cent all the S solenoids are deenergized and both 0 lamps are lighted and the counter D is operated to indicate one dollar, and thereafter the operation proceeds over again until another dollar's worth of coins has been passed through the machine.

When a five cent coin closes switch 176, relay S5¢ is energized which operates switch 70 to connect conductors 71 and 70A so that in the same manner as the fifth operation of switch 54, the lamp 5 is lighted to indicate five cents. When another nickel closes switch 176, relay S5¢ is deenergized, the digit circuits are restored to their zero condition and at the same time the circuit is shifted to energize relay 317 which acts to energize relay S10¢, which as previously noted acts through switch 10L to establish a circuit lighting the lamp 10. If after the first nickel energizing relay S5¢, four cents are added progressively the lamps 6, 7, 8, and 9 will be lighted as previously explained in connection with the switch 54 to indicate nine cents and then the addition of another cent will act in the same way as the second operation of the switch 176 by a second nickel to shift the circuit to solenoid S10¢. If a third nickel is added to operate switch 176, the S5¢ solenoid will be energized while the S10¢ is energized so that lamps 10 and 5 are lighted to indicate 15 cents. On the addition of a fourth nickel solenoids S5¢ and S10¢ are deenergized and solenoid S20¢ energized to actuate switch 20L to pass current from line 50, switch 70C, conductor 70E, switch 10L, conductor 102A, switch 20L, conductor 192, lamp 20 to return 51 to light lamp 20 to indicate twenty cents.

When a dime closes switch 322, relay S10¢ is energized to operate switch 10L and close the light circuit to the lamp 10 as previously explained. A second dime on closing switch 322 acts to cut out relay S10¢ and energize relays S20¢ to operate switch 20L to pass current from line 50, switch 70C, conductor 70E, switch 10L, conductor 102A, switch 20L, conductor 192, lamp 20 to return 51 to light lamp 20 to indicate twenty cents. A third dime on closing switch 322 acts to cut out relay S20¢ and energize relay S30¢ to operate switch 30L to pass current from line 50, switch 70S, conductor 70E, switch 10L, conductor 102A, switch 20L, conductor 101A, switch 30L, conductor 193, lamp 30 to return 51 to light lamp 30 to indicate thirty cents. A fourth dime on closing switch 322 acts to cut out relay S30¢ and energize relay S40¢ to operate switch 40L to pass current from line 50, switch 70C, conductor 70E, switch 10L, conductor 102A, switch 20L, conductor 101A, switch 30L, conductor 100A, switch 40L, conductor 194, lamp 40 to return 51 to light lamp 40 to indicate forty cents. The fifth dime on closing switch 322 acts to cut out relay S40¢ and energize S50¢ to operate switch 70C to pass current from line 50, switch 70C, conductor 70D, switch 60L, conductor 113A, switch 70L, conductor 112A, switch 80L, conductor 111A, switch 50L, conductor 195, lamp 50 to return 51 to light lamp 50 to indicate fifty cents. Relay S50¢ remains energized while the next four dimes are indicated. The sixth dime operating switch 322 acts to again energize relay S10¢ to operate switch 60L to pass current from the line 50, switch 70C, conductor 70D, switch 60L, conductor 196, lamp 60 to return 51 to light lamp 60 to indicate sixty cents. The seventh dime operating switch 322 acts to deenergize relay S10¢ and energize relay S20¢ to operate switch 70L to pass current from the line 50, switch 70C, conductor 70D, switch 60L, conductor 113A, switch 70L, conductor 197, lamp 70 to return 51 to light lamp 70 to indicate seventy cents. The eighth dime operating switch 322 acts to deenergize relay S20¢ and energize relay S30¢ to operate switch 80L to pass current from the line 50, switch 70C, conductor 70D, switch 60L, conductor 113A, switch 70L, conductor 112A, switch 80L, conductor 198, lamp 80 to return 51 to light lamp 80 to indicate eighty cents. The ninth dime operating switch 322 acts to deenergize relay S30¢ and energize relay S40¢ to operate switch 50L to pass current from line 50, switch 70C, conductor 70D, switch 60L, conductor 113A, switch 70L, conductor 112A, switch 80L, conductor 111A, switch 50L, conductor 199, lamp 90 to return 51 to light lamp 90 to indicate ninety cents. When the tenth dime operates the switch 322, all the S relays are cut out and a circuit to the counter D established to register one dollar.

When a quarter closes switch 315, relays S5¢ and S20¢ are energized, and as before explained, energization of relay S5¢ lights the digit lamp 5 and energization of relay S20¢ lights the tens lamp 20, the two indicating twenty-five cents. When a second quarter closes switch 315, relays S5¢ and S20¢ are deenergized and relay S50¢ is energized which as before explained lights the tens lamp 50 to indicate fifty cents. When the third quarter closes switch 315, relays S50¢ and S5¢ are energized to light the digit lamp 5 and the tens lamp 70 as before explained to indicate seventy-five cents. When the fourth quarter closes the switch 315, all the S relays are cut out and a circuit to the counter D established to register a dollar.

When a half dollar closes switch 325, relay S50¢ is energized and as above explained lights the tens lamp 50 to indicate fifty cents. When a second half dollar closes switch 325, relay S50¢ is cut out and a circuit to the counter D established to register a dollar.

Proceeding with a more detailed explanation, lines 50 and 51 are 110 volt supply lines, and line 50 contains a manually operated switch 52, which when closed allows current to pass along conductor 50, conductor 71, switch 70, conductor 69, switch 1L, conductor 102, switch 2L, conductor 101, switch 3L, conductor 100, switch 4L, conductor 60 to the zero light, then to conductor 51. Current also flows from conductor 50 through transformer T, back to conductor 50, energizing its secondary coil. A normally closed switch 34 is adapted to be opened when its solenoid actuator including coil 35 is energized. When switch 52 is closed, current from conductor 53 passes to conductors 85 and 84, switch 86, conductor 86A including coil 35 to conductor 58 and return 59 to energize coil 35 and open switch 34. When one cent is fed through the machine, it closes switch 54 in a circuit from the 24 volt side of the transformer along conductor 53, through switch 54, conductors 55, 56, 56A, 58, 59, 66A to return 66 at the other side of the transformer coil, energizing relay coil 57 and closing switches 72 and 73. On closing switch 73, current flows through conductor 53 and switch 73 to conductor 74, conductors 75, 76, 79, 59, 66A to return 66 to energize relay coils 77 and 78. Energization of coil 77 moves switches 142, 135, 186, and 62 to their other positions. Energization of coil 78 moves switches 86, 83, and 43 to their other positions so that coil 35 is deenergized and switch 34 is closed. Current now flows along conductor 53, conductors 85, and 84, through switch 86, conductor 87 through switch 72, conductor 88, the coil of a director switch relay X to conductors 59 and 66A to the other side of the transformer coil. Energization of coil X moves director switches 125, 1A, 2A, 3A, and 4A to their other positions, thereby connecting switch 125 with conductor 38. Current then passes along conductor 53 through switch 73, conductor 74, conductor 114, conductor 115 including then closed switch 34, conductor 116, switch 117, conductor 118, switch 119, conductor 120, switch 121, conductor 122, switch 123, conductor 124, switch 125 moved by relay X to connect with conductor 38, conductor 64, conductor 65 including coil of relay S1¢ to return 66 to energize relay S1¢, but since switch 62 has moved out of contact with conductor 137 current cannot pass along this conductor to conductor 60 and the coil 61 of transfer coil T1. Since switch 86 does not break its connection with conductor 86A until switch 62 has broken its connection with conductor 137, switch 34 is held open to prevent current passing through conductor 38 to conductor 137, switch 62, conductor 60, and coil 61 during the movement of switch 62 to its other position. Energization of coil S1¢ shifts switches 1L, 6L, and 80 to their other positions. Now current flowing along supply line 50 passes along conductor 71, switch 70, conductor 69, switch 1L, conductor 68, indicator or lamp 1 to conductor 51, lighting lamp 1 showing that one cent has gone through the machine.

As soon as the coin is registered, switch 54 opens, deenergizing coils 57, X, 77, and 78 and opening the switches controlled thereby and cutting out current supply to relay S1¢ from conductor 38. Relay S1¢ is of the delayed action type so that switch 80 does not open immediately, and as switch 83 returns to normal position upon deenergization of coil 78, current flows along conductor 53, conductors 85, 84, switch 83, conductor 82, conductor 81, switch 80, conductors 64 and 65 including coil of relay S1¢ to return 66, thereby holding switch 80 closed and energizing relay S1¢ to hold switches 80, 6L, and 1L in their other position keeping light 1 lighted. As current flows through switch 80 energizing relay S1¢, it also flows along conductor 64, conductor 137, switch 62, conductor 60, coil 61 of transfer solenoid relay T1, conductors 60, 59, and 66A to return 66. As switch 62 moves to connect conductor 137 with conductor 60 to energize coil of relay T1, switch 86 moves back to its initial position to energize coil 35 to open switch 34 so that current from conductor 64 cannot pass through conductor 38. Relay T1 then moves switches 117 and 89 to their other positions so that switch 117 now connects conductor 116 with conductor 181. Now the machine is ready for another coin.

When another cent closes switch 54, solenoid coils 57, 77, and 78 are energized as before explained for the first cent, closing switches 72 and 73 and moving switches 86, 83, 43, 142, 135, 186, and 62 to their other positions, and through switches 86 and 72 as before explained deenergizing coil 35 and energizing relay X to move director switches 125, 1A, 2A, 3A, and 4A to their other positions so that current flows along conductor 53, switch 73, conductors 74, 114, 115 including then closed switch 35, conductor 116, switch 117, conductor 181, switch 1A, conductors 39, 64A, 65A including the coil of relay S2¢ to return 66, thereby breaking the circuit through conductor 38 to coil of relay S1¢ and also through the shifting of switch 62 to conductor 90 breaking the circuit through conductor 137 so that the circuit to relay S1¢ and the holding circuit including relay T1 is opened, deenergizing relay S1¢ and relay T1 and energizing relay S2¢ which acts to move switches 2L, 7L, and 80A to their other positions so that current flows along conductors 50 and 71, switch 70, conductor 69, switch 1L, conductor 102, switch 2L, conductor 103, lamp 2 to return 51 lighting lamp 2 to indicate two cents. When this second cent moves off switch 54, this switch opens and, as in the case of the first cent, relay coils 57, X, 78, and 77 are deenergized, but as before explained in connection with switch 80 switch 80A supplying current to the coil of relay S2¢ does not open immediately so that the coil of relay S2¢ is still active while switch 83 (on deenergization of coil 78) is moving back to its initial position to again connect live conductors 53, 85, 84 with conductor 82 to supply current to conductors 81, 81A, switch 80A, conductors 64A and 65A including coil of relay S2¢ to return 66 and also via conductor 64A, conductor 138, switch 186, conductor 185, coil 129 of transfer relay T2 to return 59, thereby keeping relay S2¢ energized and energizing relay T2 and switch 86 moves back to its initial position to energize coil 35 to open switch 34 so that current from conductor 64A cannot pass through conductor 39. Energization of relay T2 moves switches 119 and 127 to their other positions to prepare for the next additional coil, and the apparatus now registers two cents.

The addition of a third and a fourth cent is effected in a manner similar to the addition of the second cent to the first cent. When the third cent closes switch 54 energizing coils 57, 77, and 78 and thereby closing switches 72 and 73 and moving switches 86, 83, 43, 142, 135, 186, and 62 to their other positions and through switches 86 and 72 as before explained deenergizing coil 35 and energizing coil X to move director switches 125, 1A, 2A, 3A, and 4A to their other positions and with relay T2 energized current flows along conductor 53, switch 73, conductors 74, 114, 115 including then closed switch 34, conductor 116, switch 117, conductor 118, switch 119, conductor 182, switch 2A, conductors 40, 64B, and 65B including coil of relay S3¢ to return 66, thereby breaking the circuit through conductor 39 to coil of relay S2¢ and also through the shifting of switch 186 to conductor 130 breaking the circuit through conductor 138 to relay T2 so that the circuit to relay S2¢ and the holding circuit including coil 61 of relay T2 is opened, deenergizing relay S2¢ and relay T2 and energizing relay S3¢ which acts through connection of conductors 101 and 104 by switch 3L as previously explained to supply current to lamp 3 to indicate three cents. As this third cent moves off switch 54, this switch opens and as before explained coils X, 57, 78, and 77 are deenergized, but as before explained in connection with switch 80, switch 80B supplying current to coil of relay S3¢ does not open immediately so that the coil of relay S3¢ is still active while switch 83 (on deenergization of coil 78) is moving back to its initial position to again connect live conductors 53, 85, 84 with conductor 82 to supply current to conductors 81, 81B, switch 80B, conductors 64B and 65B (including coil of relay S3¢) to return 66 and also via conductors 64B and 136, switch 135, conductor 44, coil 133, of transfer relay T3 to return 59, and switch 86 moves back to its initial position to energize coil 35 to open switch 34 so that current from conductor 66B cannot pass through conductor 40, thereby keeping relay S3¢ energized and energizing relay T3. Energization of relay T3 moves switches 121 and 131 to their other positions to prepare for the next additional coin, and the apparatus now registers three cents.

When the fourth cent closes switch 54 energizing coils 57, 77, and 78, the circuit through switches 86 and 72 as previously explained is established to deenergize coil 35 and energize coil X to move transfer switches 125, 1A, 2A, 3A, and 4A to their other positions so that current flows along conductor 53, switch 73, conductors 74, 114, 115 including the then closed switch 34, conductor 116, switch 117, conductor 118, switch 119, conductor 120, switch 121, conductor 183, switch 3A, conductors 144, 64C, and 65C including coil of relay S4¢ to return 66, thereby breaking the circuit through conductor 40 to coil of relay S3¢ and also through the shifting of switch 135 to conductor 134 breaking the circuit through conductor 136 to relay T3 so that the circuit to relay S3¢ and the holding circuit including relay T3 is opened, deenergizing relay S3¢ and relay T3 and energizing relay S4¢ which acts through connection of conductors 100 and 105 by switch 4L as previously explained to supply current to lamp 4 to indicate four cents. As this fourth cent moves off switch 54, this switch opens and as before explained relay coils X, 57, 78, and 77 are deenergized, but as before explained in connection with switch 80, switch 80C supplying current to coil of relay S4¢ does not open immediately so that the coil of relay S4¢ is still active while switch 83 (on deenergization of coil 78) is moving back to its initial position to again connect live conductors 53, 85, 84 with conductor 82 to supply current to conductors 81, 81C, switch 80C, conductors 64C and 65C (including coil of relay S4¢) to return 66 and also via conductors 64C and 143, switch 142, conductor 142A, coil 141 of transfer relay T4 to return 59 to thereby keep relay S4¢ energized and energize relay T4, and switch 86 moves back to its initial position to energize coil 35 to open switch 34 so that current from conductor 64C cannot pass through conductor 144. Energization of relay T4 moves switches 123 and 139 to their other positions to prepare for the next coin and the apparatus now registers four cents.

When a fifth cent closes switch 54, energizing the coils of solenoids 57, 77, and 78, the circuit through coil 35 is broken and that through coil X is established as previously explained to move director switches 125, 1A, 2A, 3A, and 4A to their other positions, and with relay T4 energized current flows along conductor 53, switch 73, conductors 74, 114, 115 including the then closed switch 34, conductor 116, switch 117, conductor 118, switch 119, conductor 120, switch 21, conductor 122, switch 123, conductor 184, switch 4A, conductor 145, switch 146, conductor 147, switch 148, conductors 149, 150B (including switch 150C), 64D and 65D (including coil of relay S5¢) to return 66, thereby breaking the circuit through conductor 144 to relay S4¢ and through the shifting of switch 142 breaking the circuit through conductor 143 to relay T4 so that the circuit to relay S4¢ and the holding circuit including relay T4 is opened, deenergizing relay S4¢ and relay T4 and energizing relay S5¢ which acts through the connection of conductors 71 and 70A by switch 70 as previously explained to supply current to lamp 5 to indicate five cents. As this fifth cent moves off switch 54, this switch opens and as before solenoids X, 57, 78, and 77 are deenergized, but as before explained in connection with switch 80, switch 80D supplying current to the coil of relay S5¢ is still active while switch 83 (on deenergization of coil 78) is moving back to its initial condition to connect live conductors 53, 85, 84 with conductor 82 to supply current to conductors 81, 81D, switch 80D, conductors 64D and 65D (including coil of relay S5¢) to return 66 and also via conductors 64D and 150, switch 43, conductor 161 (including coil 162 of transfer relay T5) to return 59 to thereby keep relay S5¢ energized and energize relay T5, and switch 86 in moving back to its original position causes coil 35 to be energized to open switch 34 so that current cannot pass through conductor 150B. Energization of relay T5 moves switches 151, 152, and 146 to their other positions to prepare for the next coin, and the apparatus now registers five cents.

If instead of five pennies, a nickel is fed into the apparatus, it closes switch 176 so that current now passes through conductor 53, conductors 174 and 175, switch 176, conductor 63 including the coil of relay 180, conductors 56A and 58 to return 59. Energizing relay 180 moves switches 170 and 172 to their other positions so that current from live conductor 174 flows via conductor 173, switch 172, conductors 115 and 114 to conductors 75, 76, and 79 to return 59, thereby energizing the coils 77 and 78 to shift switches 142, 135, 186, 62, 86, 83, and 43 to their other positions so that current now passes through conductors 53, 85, 84, switch 86, conductors 87, 169, switch 170, conductor 171 including coil 46 of relay 5X to return 59. Energization of relay 5X moves switches 156, 148, and 41 to their other positions so that current can now pass through conductors 53, 174, 173, switches 172, conductor 115 including then closed switch 34, conductor 116, conductor 153, switch 152, conductor 154, switch 148, conductors 149, 150B including switch 150C, 64D, and 65D (including coil of relay S5¢) to return to energize relay S5¢ and thus move switch 70 to connection with conductor 70A and associated conductors previously mentioned to light the lamp 5 to indicate five cents and connect switch 80D with conductors 81D and 64D. As the nickel passes switch 176 coils 180, 77, 78, and 5X are deenergized, but as before explained in connection with switch 80, switch 80D supplying current to coil of relay S5¢ does not open immediately so that relay S5¢ is still energized while the switches controlled by the above named coils are moving back to their initial positions and then switch 83 again connects live conductors 53, 85, 84 with conductor 82 to supply current to conductors 81, 81D, switch 80D, conductors 64D and 65D (including coil of relay S5¢) to return 66 and also via conductors 64D and 150, switch 43, conductor 161, coil 162 of transfer relay T5 to return, thereby keeping relay S5¢ energized and energizing relay T5 and switch 86 moving back to conductor 86A causes coil 35 to be energized to open switch 35 so that current cannot pass through 150B. Energization of relay T5 moves switches 151, 152, and 146 to their other positions to prepare for the next additional coin, and the apparatus now registers five cents. During the addition of a succeeding four cents the solenoid or relay S5¢ will remain energized to hold switch 70 in contact with conductor 70A so that circuits to the lamps 6, 7, 8, and 9 can be completed as above described, but the change in position of any of switches 6L, 7L, 8L, or 9L cuts out the circuit to lamp 5.

If now with five cents registered another cent operates switch 54, the coils 57, 77, and 78 will be energized, and through the relays and switches previously described in connection with the register of the first cent the relays S1¢ and X will be energized, while relays S5¢ and T5 are still energized. With the relay T5 energized, the energization of coil 78 keeps relay T5 energized, the circuit being conductors 53, 85, 84, switch 83, conductors 92 and 91, switch 151, conductor 160, switch 43, conductor 161, coil 162 of relay T5 to return 59 and with relay X and coil 57 energized, relay S5¢ is kept energized, the circuit being conductor 53, switch 73, conductors 74, 114, 115 including then closed switch 34, switch 116, switch 43, conductors 116, 153, switch 152, conductor 155, switch 156, conductor 150B including switch 150C, conductors 64D and 65D (including coil of relay S5¢). Then when this sixth cent passes the switch 54, the relay S1¢ will remain energized and coil 34 will be energized to open switch 34 and the relay T1 will be energized and relay X deenergized in the same way as that described for the first cent, and then since relay S5¢ is holding switch 70 in contact with conductor 70A and relay S1¢ is holding switch 6L in contact with conductor 107 the lamp 6 will be lighted to register six cents. Relay S5¢ and T5 continue to be energized since current from conductor 53 then passes to conductors 85, 84, switch 83, conductors 82, 81D, switch 80D, conductors 64D and 65D (including coil of relay S5¢), conductor 150, switch 43, conductor 161, coil 162 of relay T5 to return. When the seventh cent contacts and passes the switch 54, the same action takes place as described above in connection with the sixth cent as to the holding in of the relay S5¢ and T5 and the same action takes place as described above in connection with the second cent deenergizing relays S1¢ and T1 and energizing relays S2¢ and T2, relay S2¢ then moving switch 7L to conduct with conductor 107 to light the lamp 7 as previously explained.

When the eighth cent contacts and passes the switch 54, the same action takes place as described above in connection with the sixth cent as to holding of the relays S5¢ and T5 and the same action as described above in connection with the third cent deenergizing relays S2¢ and T2 and energizing relays S3¢ and relay T3, relay S3¢ then moving switch 8L to contact conductor 108 to light the lamp 8 as previously explained.

When the ninth cent contacts and passes the switch 54, the same action takes place as described above in connection with the sixth cent as to holding of the relays S5¢ and T5 and the same action as described above in connection with the fourth cent, deenergizing relays S3¢ and T3 and energizing relays S4¢ and relay T4, relay S4¢ then moving switch 9L to contact conductor 110 to light the lamp 9 as previously explained.

With relays S4¢, S5¢, T4, and T5 energized, switches 80C and 80D are closed and switch member 83 is connecting conductors 84 and 82 so that current passes from conductor 53 to conductors 85 and 84, switch 83, conductors 82, 81 to branch conductors 81C and 81D which through closed switches 80C and 80D supply current to conductors 64C and 65C and 64D and 65D including the S4¢ and S5¢ coils respectively, and through switch 86 coil 35 is energized to open switch 34. Also current is passing from conductors 64C, 143, switch 142, conductor 142A including coil of relay T4 to return and passing from 64D, conductor 150, switch 43, conductor 161 including coil of relay T5 to return. Then when the next penny or tenth cent operates switch 54 energizing coils 57, 77, and 78, switches 142, 86, 83, 43 are moved to their other positions and switches 73 and 72 are closed so that coil X is energized as before explained. Since switches 80C and 80D have a delayed action and switches 142, 86, 83, 43 are of the make before break type relays S4¢, S5¢, T4, and T5 stay closed through the circuits above described while the switches controlled by coils 77 and 78 are moving to their other positions so that the switch 83 is supplying current from live conductors 85 and 84 to both conductors 82 and 92 and the switch 142 is supplying current to both conductors 42 and 143 to respectively keep relays T5 and T4 energized, while the switch 86 keeps coil 35 energized to open switch 34 until switches 142, 86, and 83 break their initial contacts. In this connection when switch 83 connects conductor 92 with the current supply, this current passes via conductor 91 to switch 151, conductor 160, switch 43, conductor 161 to coil of relay T5 and from conductor 91, conductor 140, switch 139, conductor 42, switch 142, conductor 142A to coil 141 of relay T4 to keep these relays T4 and T5 energized so that, when coil X shifts its associated switches to their other position, current from line 53 passes via closed switch 73 to conductors 74, 114, 115 including then closed switch 34, conductor 116, switch 117, conductor 118, switch 119, conductor 120, switch 121, conductor 122, switch 123, conductor 184, switch 4A, conductor 145, switch 146, conductor 156, switch 41, conductors 158 and 319, coil 317 (for the 10¢ register), conductor 282 to return, energizing coil 317. The moving of switch 83 to conductor 92 opens the circuit to relay S5¢ including switch 80D and to relay S4¢ including switch 80C so that this source of energizing current to these relays is cut off and at the same time since movement of the switch 142 to conductor 42 cuts off the other energizing source to relay S4¢ while current passing along conductor 156 also flows through conductor 156A and relay 156B to return 66B and opens switch 150C so the other energizing source of current through conductor 150B to relay S5¢ is cut off so that relays S4¢ and S5¢ are deenergized but current is still flowing to relays T4 and T5 from switch 83 and conductor 92 as above described so that current is still flowing through conductor 158 as above described to energize coil 317. Energization of coil 317 closes switches 301 and 302. Current now passes from conductor 53 via conductors 174, 174A, and 306, switch 302, conductor 308, conductor 279 (including coils 309 and 310), conductor 282 to return, energizing coils 309 and 310 moving switches 291, 292, 293, 290, 289, 288, and 287 to their other positions. Switch 292 in its initial position connects with a conductor 45 including a solenoid coil 37 and connected to return conductor 282. A normally closed switch 36 is adapted to be opened when its solenoid actuator including coil 37 is energized. As soon as switch 52 is closed, current from conductor 53 passes to conductors 174 and 174A, switch 292, conductor 45 to return so that coil 37 is energized to open switch 36, but when coil 310 is energized and switch 292 is moved to its other position, coil 37 is deenergized and switch 34 again closed. Current from live conductors 174 and 174A then passes via switch 292 to conductor 297, switch 301, conductor 286 including the coil of relay XX to return 59 moving switches 215, 220, 238, 227, 242, and 251 to their other positions. Now current from live conductor 308 flows via conductors 276 including then closed switch 36, conductor 229, switch 230, conductor 231, switch 232, conductor 233, switch 234, conductor 235, switch 236, conductor 214, switch 215, conductor 221, switch 222, conductors 207, 205, 64E, 200 (including coil of relay S10¢) to return 66B energizing relay S10¢ to shift switches 10L, 60L, and 80E to their other positions so that switch 10L connects with conductor 191 to light lamp 10 as previously explained. As this tenth cent passes out of contact with switch 54, coils 57, 77, 78, and X are deenergized so that the circuits previously described through switch 83 and conductor 92 are cut out and relays T4 and T5 are deenergized and also the circuit via conductor 158 is cut out so that coils 317, 309, and 310 are deenergized so that coil 37 through switch 292 is again energized to open switch 36, but switch 80E, similar to 80, has a time lag and switch 293 is of the make before break type so that current flows from live conductors 53, 174, and 174A via switch 293, conductors 294 and 69A through switch 80E to conductors 64E and 200 (including coil of relay S10¢) to return 66B to keep relay S10¢ energized and also from conductor 64E flows to 205A, switch 290, conductor 274, coil 342 of transfer and holding relay T10 to return 59 thereby holding switches 80E, 60L, and 10L in their other position and moving switches 230 and 247 to their other position to prepare for another tens increase.

If as noted previously switch 176 has been operated by a nickel to energize relays 5X and S5¢ and then relay T5 to light the lamp 5 and keep the relays S5¢ and T5 energized as before explained, we now close switch 176 again by another nickel, coils 180, 77, 78 will be energized, switches 170, 172 will be closed and switches 86, 83, 43, and 62 will be moved to their other positions. Current from conductor 53 then passes via conductors 85, 84, switch 86, conductors 87 and 169, switch 170, conductor 171 (including coil of relay 5X) to return, again energizing relay 5X. With relays T5 and 5X energized so that switches 151, 152, 146, 156, 148, and 41 are in their other positions, current from conductor 53 then passes via conductors 174 and 173, switch 172, conductor 115 including then closed switch 34, conductors 116 and 153, switch 152, conductor 155, switch 41, conductor 158, conductor 319 (including coil 317) to return 282 thereby energizing coil 317 which functions as before explained in connection with the tenth cent to energize relay S10¢ to light the lamp 10. When relay 5X was energized moving switches 156 and 148 to their other positions, the holding circuit through conductor 150B to solenoid S5¢ was cut out so that the five lamp was extinguished, and the machine now registers ten cents. When this second nickel is released, switch 176, relays 180, 77, 78, T5, and 5X are deenergized in the same way that was described for the first nickel.

If we have registered six cents so that relays S1¢, S5¢, T1, and T5 are energized and close switch 176 with another nickel, coils 180, 77, 78 will be energized as previously explained, switches 170 and 172 will be closed and switches 86, 83, 43, and 62 will be shifted to their other positions. As in the case of the first nickel, closing of switch 170 establishes current through relay 5X to energize it, and switch 83 will connect the current source with conductor 92 and switch 62 will connect with conductor 90 so that current from conductor 92 as in the previous case of adding one cent to nine cents will keep relay T5 energized and will also supply current to relay T1 (in the same way as it supplied current to relay T5) to keep relay T1 energized (switch 89 being closed). Energization of relay 5X shifts switches 159, 156, 148, and 41 to their other positions so that the supply of current to relay S5¢ via conductor 150B is cut off, and since switch 83 has been shifted to conductor 92, the supply of current to relay S5¢ has been cut off so that relay S5¢ is deenergized while relays T1, S1¢, TL, and 5X remain energized and current now passes from conductor 53, via conductors 174 and 173, switch 172, conductor 115 including then closed switch 34, conductors 116, 153, switch 152, conductor 155, switch 41, conductors 158, 319, relay coil 317 to return 282 energizing coil 317 which functions as before explained in connection with the tenth cent to energize relay S10¢ to light the lamp 10 so that both lamps 1 and 10 are lighted to register eleven cents. When this nickel releases switch 176, relays 180, 77, 78, T5, and 5X are deenergized and coil 37 is again energized in the same way as that described for the first nickel.

In a similar manner if five cents is added to a previous register of seven, eight, or nine cents, the digit lamps 2 to 4 and the lamp 10 will be lighted to indicate 12, 13, and 14 cents respectively.

If a dime contacts and passes the switch 322, then current from live conductors 53, 174, and 174A passes via conductors 316, 323, switch 322, conductor 319, coil 317 to return 282, energizing coil 317 which then acts as previously described to energize relay XX and then the relay S10¢ to light the lamp 10 and energize relay T10 to keep relay S10¢ energized. Another dime contacting switch 322 will act in the same way to energize coil 317 which we have seen acts through switch 302 to energize coils 309 and 310 and through switches 292 and 301 and the circuit connections to energize relay XX (similar to relay X) shifting switches 215, 220, 238, 227, and 242 to their other positions. Now current passes from live conductor 174A, switch 302, conductors 308, 276 including then closed switch 36, conductor 229, switch 230, conductor 219, switch 220, conductor 239, switch 240, conductors 208, 211, conductor 64F, conductor 201 (including coil of relay S20¢) to return 66B, energizing relay S20¢ to move switches 20L, 70L, and 80F to their other positions and light the lamp 20 as previously explained and breaking the circuit through conductor 221 to relay S10¢ and also through the shifting of switch 290 to conductor 277 breaking the circuit through conductor 205A so that the circuit to relay S10¢ and the holding circuit including relay T10 is opened, deenergizing relays S10¢ and T10. With switch 80F closed since switch 293 is of the make before break type, current can now pass from conductor 174A via switch 293 to conductors 294, 69A, switch 80F, conductors 64F and 201 (including coil of relay S20¢) to return 66B to keep S20¢ energized. When the second dime moves off switch 322, this switch opens and, as in the case of the first dime, relay coils 317, 310, 309, and XX are deenergized, but as before explained in connection with switch 80, switch 80F supplying current to the coil of relay S20¢ does not open immediately so that relay S20¢ is still active while switches 292 and 293 (on deenergization of coil 310) are moving back to their initial position to again connect live conductor 174A with conductor 294 to supply current to conductor 69A, switch 80F, conductors 64F and 201 (including coil of relay S20¢) to return 66B and also via conductors 64F and 212, switch 289, conductor 283, coil 343 of relay T20 to return 59, thereby keeping relay S20¢ energized and energizing relay T20 while switch 292 again connects with conductor 45 to energize coil 37 to open switch 36. Energization of relay T20 moves switches 232 and 248 to their other positions to prepare for the next dime and the apparatus now registers twenty cents.

When the third dime closes switch 322, energizing coils 317, 310, 309 and moving switches 291, 292, 293, 287, 288, 289, 290 to their other positions and through switches 301 and 302 as before explained energizing coil XX to move director switches 215, 220, 233, 227, 242, and 251 to their other positions and with relay T20 energized, current flows along conductor 174A, switch 302, conductors 308, 276 including then closed switch 34, conductor 229, switch 230, conductor 231, switch 232, conductor 237, switch 238, conductor 226, switch 225, conductors 224 and 223, conductors 64G and 202 including coil of relay S30¢ to return 66B, thereby breaking the circuit through conductor 239 to relay S10¢ and also through the shifting of switch 289 to conductor 278 breaking the circuit through conductor 212 so that the circuit to relay S20¢ and the holding circuit including relay T20 is opened, deenergizing relays S20¢ and T20 and energizing relay S30¢ which acts through connection of conductors 101A and 193 by switch 30L as previously explained to supply current to lamp 30 to indicate thirty cents. When this third dime releases switch 322, this switch opens and, as in the case of the first dime, relay coils 317, 310, 309, and XX are deenergized, but switch 80G, similar to switch 80, supplying current to relay S30¢ does not open immediately, so that it is still active while switches 292 and 293 are moving back to their initial positions to again connect live conductor 174A with conductor 294 to supply current to conductor 69A, switch 80G, conductors 64G and 200 (including coil of relay S20¢) to return 66B and also via conductors 64G, 213, switch 288, conductor 284, coil 344 of relay T30 to return 59, thereby keeping relay S30¢ energized and energizing relay T30, while switch 292 again connects with conductor 45 to energize coil 37 to open switch 36. Energization of relay T30 moves switches 234 and 249 to their other positions to prepare for the next dime, and the apparatus registers thirty cents.

When the fourth dime closes switch 322 energizing coils 317, 310, 309 and moving their switches to their other positions and through switches 301 and 302, as before explained, energizing coil XX to move its transfer switches to their other positions and with relay T30 energized, current flows along conductor 174A, switch 302, conductors 308, 276 including then closed switch 34, conductor 229, switch 230, conductor 231, switch 232, conductor 233, switch 234, conductor 228, switch 227, conductor 243, switch 244, conductor 245, conductors 215, 64H, and 203, including coil of relay S40¢ to return 66B, thereby breaking the circuit through conductor 226 to relay S30¢ and also through the shifting of switch 288 to conductor 251 breaking the circuit through conductor 213 so that the circuit to relay S30¢ and the holding circuit including relay T30 is opened, deenergizing relay S30¢ and T30 and energizing relay S40¢ which acts through connection of conductors 100A and 194 by switch 40L, as previously explained, to supply current to lamp 40 to indicate forty cents. When this fourth dime releases switch 322, this switch opens and again relay coils 317, 310, 309, and XX are deenergized, but switch 80H supplying current to relay S40¢ does not open immediately so that it is still active while switches 292 and 293 are moving back to their initial position to again connect live conductor 174A with conductor 294 to supply current to conductor 69A, switch 80H, conductors 64H and 203, including coil of relay S30¢, to return 66B and also via conductors 64H, 206, switch 287, conductor 285, coil 345 of relay T40 to return, thereby keeping relay S40¢ energized and energizing relay T40 while switch 292 again connects with conductor 45 to energize coil 37 to open switch 36. Energization of relay T40 shifts switches 236 and 250 to their other positions to prepare for the next dime, and the apparatus registers forty cents.

When the fifth dime closes switch 322, energizing coils 317, 310, 309 and moving their switches to their other positions and through the switches 301 and 302, as before explained energizing coil XX to move its director switches to their other positions and with relay T40 energized, current flows along conductor 174A, switch 302, conductors 308, 276 including then closed switch 36, conductor 229, switch 230, conductor 231, switch 232, conductor 233, switch 234, conductor 235, switch 236, conductor 241, switch 242, conductor 252, switch 253, conductors 254 and 256, switch 257, conductor 258, switch 264, conductors 263, 261 including then closed switch 261A, 64I and conductor 204 (including coil of relay S50¢) to return 66B, thereby breaking the circuit through conductor 243 to relay S40¢ and also through the shifting of switch 287 to conductor 280 breaking the circuit through conductor 206 to S40¢ so that the circuit to relay S40¢ and the holding circuit including relay T40 is opened, deenergizing relay S40¢ and T40 and energizing relay S50¢ which acts through connection of conductors 50 and 70D by switch 70C, as previously explained, to supply current to lamp 50 to indicate fifty cents. When this fifth dime releases switch 322, this switch opens and again relay coils 317, 310, 309, and XX are energized, but switch 80I supplying current to relay S50¢ does not open immediately so that it is still active while switches 292 and 293 are moving back to their initial positions to again connect live conductor 174A with conductor 294 to supply current to conductor 69A, switch 80I, conductors 64I and 204 (including coil of relay S50¢) to return 66B and also via conductors 64I, switch 291, conductor 291A, coil 348 of relay T50 to return, thereby keeping relay S50¢ energized and energizing relay T50 while through switch 292 coil 37 is energized to open switch 36. Energization of relay T50 shifts switches 257, 265, and 270 to their other positions to prepare for the next dime, and the apparatus registers fifty cents.

When the sixth dime closes switch 322, energizing coils 317, 310, 309 and moving their switches to their other positions and through the switches 301 and 302, as before explained energizing coil XX to move its transfer switches to their other positions, the relay S10¢ will be energized as previously described in connection with the first dime while relays S50¢ and T50 are still energized while switch 291 is moving from conductor 64I to conductor 296. With T50 energized, the energization of coil 310 keeps it energized, the circuit being conductor 174A, switch 293, conductors 307, 246, switch 270, conductor 271, switch 291, conductor 291A, coil 348 of relay T50 to return 59, and with relay XX and coil 317 energized, relay S50¢ is kept energized, the circuit being conductors 174A and 306, switch 302, conductors 308 and 276 including then closed switch 34, conductor 229, conductor 266, switch 265, conductors 259A and 259, switch 260, conductor 261 including then closed switch 261A, conductors 64I and 204 including coil of relay S50¢ to return 66B. When this sixth dime passes the switch 322, the relay S10¢ will remain energized and the relay T10 will be energized and relay XX and coil 37 deenergized in the same way as that described for the first dime, and then since relay S50¢ is holding switch 70C in contact with conductor 70D and relay S10¢ is holding switch 60L in contact with conductor 196, the lamp 60 will be lighted to register sixty cents. Relays S50¢ and T50 continue to be energized since current from conductor 174A then passes via switch 293, conductors 294, 69A, switch 80I, conductors 64I and 200 including coil of relay S50¢ and via conductor 64I, switch 291, conductor 291A, coil 348 of relay T50 to their return. Also current from 69A passes switch 80E, conductors 64E, 205A, switch 290, conductor 274, coil 342 of relay T10 to return keeping relays S10¢ and T10 energized.

When the seventh dime contacts and passes the switch 322, the same action takes place as described above in connection with the sixth dime as to the holding in of the relays S50¢ and T50 and the same action takes place as described above in connection with the second dime, de-energizing relays S10¢ and T10 and energizing relay S20¢ and relay T20, relay S20¢ then moving switch 70L to contact conductor 197 to light lamp 70 as previously explained.

When the eighth dime contacts and passes the switch 322, the same action takes place as described above in connection with the sixth dime as to the holding in of the relays S50¢ and T50 and the same action takes place as described above in connection with the third dime, deenergizing relays S20¢ and T20 and energizing relay S30¢ and relay T30, relay S30¢ then moving switch 80L to contact conductor 198 to light lamp 80 as previously explained.

When the ninth dime contacts and passes the switch 322, the same action takes place as described above in connection with the sixth dime as to the holding in of the relays S50¢ and T50 and the same action takes place as described above in connection with the fourth dime, deenergizing relays S30¢ and T30 and energizing relays S40¢ and relay T40, relay S40¢ then moving switch 50L to contact conductor 199 to light lamp 90 as previously explained.

With relays S50¢, S40¢, T40, and T50 energized, switches 80H and 80I are closed and switch member 293 is connecting conductors 174A and 294 so that current passes to conductor 69A through switches 80H and 80I to conductors 64H, 203 and 64I, 204 and the coils of relays S50¢ and S40¢. Also current is passing from conductors 64H, 206, switch 287, conductor 285 to coil 345 of relay T40 and from conductor 64I, switch 291, conductor 291A to the coil 348 of relay T50. When the tenth dime operates switch 322 energizing coils 317, 310, and 309 and moving their switches to their other positions and the switches 301 and 302 are closed, the coil XX is energized and coil 37 deenergized as before explained. Since switches 80H and 80I have a delayed action and switches 291, 293, and 287 are of the make before break type, relays S40¢, S50¢, T40, and T50 stay closed through the circuits above described while the switches controlled by coils 309 and 310 are moving to their other positions so that switch 293 is supplying current from conductor 174A to both conductors 307 and 294 to keep relays S40¢ and S50¢ energized. In this connection when switch 293 connects conductor 307 with the current supply, this current passes via conductor 246, switch 270, conductor 271, switch 291, conductor 291A, coil 348 of relay T50 to return 59 and also via conductor 246, switch 250, conductor 280, switch 287, conductor 285, coil 345 of relay T40 to return to keep relay T50 and T40 energized so that when coil XX shifts its associated switches to their other positions, current from conductor 174A passes via closed switch 302 to conductors 308, 276 including then closed switch 34, conductors 229, switch 265, conductors 259A and 259, switch 260, conductors 261 including then closed switch 261A, 64I, and 204 including S50¢ to return keeping relay S50¢ energized and also from conductor 229 passes via switch 230, conductor 231, conductor 232, switch 233, conductor 234, switch 235, conductor 241, switch 242, conductor 252, switch 253, conductors 254, 256, 257, 272, switch 273, conductor 210, electrically operated dollar counter D, conductor 209 to return 66B to register one dollar. The moving of switch 293 to conductor 307 opens the circuits to relays S40¢ and S50¢ including the switches 80H and 80I so that this energizing source to these relays is cut off and at the same time movement of the switch 287 to conductor 280 cuts off the other energizing source to relay S40¢ while current passing along conductor 272 also flows through conductor 258A and coil of relay 258B to return 59 and opens switch 261A in line 261 so that the other energizing source of current to relay S50¢ is cut off so that relays S40¢ and S50¢ are deenergized but current is flowing to relays T40 and T50 from switch 293 and conductor 307 as above described. As this tenth dime passes out of contact with switch 322, coils 317, 310, 309, and XX are deenergized so that the circuits previously described through switch 293 are cut out and relays T40 and T50 are deenergized, and coil 37 again energized to open switch 36. The switches 34 and 36, 150C and 261A in the circuits noted above prevent any false registry while other switches are changing their positions. On deenergization of relay S50¢ the switch 70C returns to its initial position and the zero lamp is lighted.

When a quarter closes switch 315, current passes from live conductors 174A and 316 via this switch to conductors 314, 313 and coil 311 to the return 282, moving switches 303, 304, and 305 to their other positions and establishing the following circuits: (1) Conductors 174A and 303A, switch 303, conductors 177 and 63 to coil 180. (2) Conductor 174A, switch 305, conductor 308, conductor 279 including coils 309 and 310 thus energizing coils 180, 309, and 310. Energization of coil 180 effects the same result as the passage of a nickel past the switch 176, and this we have seen energizes relay 5X, coils 77 and 78 followed by the energization of relay S5¢ to light the lamp 5 and with 5X energized, switches 156, 148, and 41 are moved to their other positions so that current from conductors 53, 174, and 173 flows through closed switch 172, conductor 115 including then closed switch 34, conductor 116, conductor 153, switch 152, conductor 155, switch 41, conductor 116, switch 304, conductors 350 and 350A including coils 346 and 347 of double relay X20 to return 59 energizing said coils to shift their switches 217, 222, 240, 267, 225, 244, and 253 to their other positions, the energization of coils 309 and 310 having also shifted their switches to their other positions. Now current from line 174A passes via switch 305 and conductor 308 to conductors 276 including then closed switch 36, conductor 229, switch 230, conductor 231, switch 232, conductor 233, switch 234, conductor 235, switch 236, conductor 214, switch 215, conductor 216, switch 217, conductor 208, conductors 211, 64F, and 201 including the coil of relay S20¢ to return 66B, energizing said relay S20¢ and lighting the 20 lamp which in conjunction with the 5 lamp registers twenty-five cents. As in the case of two dimes current from conductor 211 passes via conductor 212, switch 289, conductor 283 to coil 343 of relay T20 to return to energize this coil and move switches 232 and 248 to their other positions to prepare for the next coin. As the quarter passes the switch 315, coils 311, 310, 309, and 180, 77, and 78 are deenergized and coil 37 energized to open switch 36, but as in the case of a nickel, relay T5 is energized to keep relay S5¢ energized, and as in the case of the two dimes relay T20 is energized to keep relay S20¢ energized.

When a second quarter operates switch 315, coils 311, 310, 309, and 180 are again energized followed by the energization of coils 77 and 78 and the energization of relay 5X with the shifting of its switches while relay T5 is energized so that current from conductors 174, 173 passes via switch 172 to conductor 115 including then closed switch 34, conductors 116 and 153, switch 152, conductor 155, switch 43, conductors 158, 319, coil 317 to return 282, and this through the shifting of switches 156, 148, 83, and 43 cuts out the supply of current to relay S5¢ so that the digit zero lamp is lighted while relays T5 and 5X are energized and coil 37 is energized. Energization of coil 317 closes switches 301 and 302 so that current from 174A passes via switch 292 to conductor 297, switch 301, conductor 286, coil of relay XX to return 59 so that coil XX is energized and its switches moved to their other positions, and since the conductor 116 is receiving current from live conductor 115, coils 346 and 347 are energized so that their switches are in their other positions. Now current from conductor 174A passing through switch 305 or 302 to conductor 308 flows through conductor 276 including then closed switch 36 to conductor 229, switch 230, conductor 231, switch 232, conductor 237, switch 238, conductor 226, switch 225, conductor 254, 256, switch 257, conductor 258, switch 264, conductor 263, conductors 261 (including then closed switch 261A), 64I, and 204 including the coil of relay S50¢ to return energizing relay S50¢ to shift switch 70C into contact with conductor 20D while the shifting of switch 289 to conductor 278 has cut out relay S20¢ so that switch 70L is in its initial position so that the 50 lamp is lighted. Release of the switch 315 by the second quarter deenergizes coils 317, 311, 310, 309, XX, 180, 5X, 77, 78, and T5 and energized coil 37 to open switch 36, but as switch 291 moves into contact with conductors 64I and 293 moves into contact with conductor 294, while switch 80I is closed, relay S50¢ will be kept energized and current from conductor 64I passing through switch 291 to conductor 291A will energize coil 348 of relay T50 so that relays S50¢ and T50 will be energized.

When a third quarter passes switch 315 while relays S50¢ and T50 are energized, coils 311, 310, 309, and 180 are again energized followed by the energization of coils 346, 347, 77, and 78 as in the case of the first quarter. Now current from line 174A passes via switch 305 and conductor 308 to conductors 276 (including then closed switch 36), and conductor 229, switch 230, conductor 231, switch 232, conductor 233, switch 234, conductor 235, switch 236, conductor 214, switch 215, conductor 216, switch 217, conductor 208, conductors 211, 64F, and 201 including coil of relay S20¢ to return energizing relay S20¢ and move switch 70L into contact with conductor 197 to light the lamp 70 (since relay S50¢ is connecting conductor 50 with conductor 70D and since energization of coil 180 has caused relay S5¢ to be energized to light lamp 5) the apparatus registers seventy-five cents. As in the case of the first quarter, passage of current through conductor 212 at this time energizes coil 343 of relay T20 and moves switches 232 and 248 to their other positions. As the third quarter passes the switch 315, coils 311, 310, 309 and 180, 77, and 78 are deenergized and coil 37 energized to open switch 36, but as in the case of a nickel relay T5 is energized to keep relay S5¢ energized and relays T20, T50 are energized and relay S50¢ kept energized.

When the fourth quarter passes switch 315 while relays S5¢, T5, T20, T50, and S50¢ are energized, coils 311, 310, 309, and 180 are again energized and coil 37 deenergized followed by the energization of coils 346, 347, 77, and 78 as in the case of the first quarter. Now current passes via switch 305 and conductor 308 to conductors 276 (including then closed switch 36) and switch 230, conductor 231, switch 232, conductor 237, switch 238, conductor 226, switch 225, conductors 254, 256, switch 257, conductor 272, switch 273, conductor 210, dollar relay D, conductor 209 to return and in passing via conductor 258B energizes relay 258B to open switch 261A and hence conductors 261 and 64I to cut out relay S50¢. Also on the digit side, the energization of relay 5X has cut out relay S5¢ so that both of the zero lamps are lighted and the apparatus registers one dollar. As the fourth quarter passes the switch 315, coils 311, 310, 309, and 180, 77, and 78 and coils 346 and 347 are deenergized and coil 37 energized to open switch 34 and relays T20 and T50 are deenergized.

When a half dollar closes switch 325, current from conductors 174A and 306 passing via conductors 316, 323, 324, switch 325, conductors 326 and 327, coil 328 to return 282 energizes coil 328 which closes switches 299 and 300. Closing switch 300 connects conductors 174A and 306 with conductors 308 and 279 energizing coils 309 and 310 to shift their switches to their other positions so that current from conductor 174A passes via switch 292, conductor 297, switch 299, conductor 298, coil 349 of relay 50X to return energizing relay 50X to shift switches 260, 264, and 273 to their other positions. Now current from line 308 passes via conductors 276 (including then closed switch 36), 229, and 266, switch 265, conductor 260A, switch 260, conductors 261 including then closed switch 261A, 64I, and 204, including coil of relay S50¢ to return energizing relay S50¢ and lighting lamp 50 to register fifty cents. On release of switch 325 by this half dollar relay T50 is energized, and since current from 64I passes through switch 291 and conductor 291A including coil of relay T50 to return, relay S50¢ is kept energized by current passing from switch 291 via conductor 294, switch 80I, and conductors 64I and 204, as previously described.

When the second half dollar passes the switch 325, with relays S50¢ and T50 energized, relay 50X is again energized as described above for the first half dollar, shifting its switches. Now current passes via 308, conductor 276 (including then closed switch 36), 229, and 266, switch 265, conductor 259A, switch 273, conductor 210, dollar counter D, conductor 209 to return to register one dollar and cutting out relay S50¢.

There are certain special cases that have to be provided for which involve the use of relays 20X and 10X. These occur in the range of thirty-five cents to forty-nine cents when a quarter is added. Considering the case of adding a quarter to thirty-five cents, with thirty-five cents registered relays S5¢, T5, S30¢, and T30 are energized, and their switches are in their other positions. A quarter, passing switch 315 will as we have seen in connection with the first quarter energize coil 311 and through the shifting of its switches energize coils 309, 310, 180, and 317 shifting their switches and energizing relays 5X and XX and coils 346 and 347 shifting their switches and relays S5¢ and S30¢ and XX and coil 37 will be deenergized. Under these conditions current passes from conductor 174A via switch 305, conductors 308, 276 (including then closed switch 36) and 229, switch 230, conductor 231, switch 232, conductor 233, switch 234, conductor 228, switch 227, conductor 243, switch 244, conductor 64K, coil 341 of relay 10X to return 66B energizing relay 10X and closing its switches 332 and 333. Now current can pass from conductor 174A via conductors 337, 336, switch 333, conductors 339 and 256, switch 257, conductor 258, switch 264, conductors 263, 261 (including then closed switch 261A), 64I, 204 to return 66B energizing relay S50¢ and at the same time current from conductor 336 passes via switch 332, conductors 334, 205, 64E, and 200 including coil of relay S10¢ to return energizing relay S10¢ so that switch 70C in contact with conductor 70D and switch 60L in contact with conductor 196 will as previously explained establish a circuit through the lamp 60 to indicate sixty cents.

After the quarter passes the switch 315, the coils 311, 317, 180, 310, 309, relay 5X and XX, coils 346 and 347 will be deenergized but relay S10¢ and T10 (energized as a result of energizing relay S10¢ as previously explained in connection with the first dime) and relays S50¢ and T50 (energized as a result of energizing S50¢ as previously explained in connection with the fifth dime) will remain energized and coil 37 will be energized to open switch 36 to prepare for the next coin.

Considering adding a quarter to forty-five cents. With forty-five cents registered, relays S5¢ and T5, S40¢ and T40 are energized and their switches are in their other positions. A quarter passing switch 315 will as before energize coil 311 and through the shifting of its switches energize coils 309, 310, 180, 317 shifting their switches and energizing relays 5X and XX and coils 346 and 347 shifting their switches and relays S5¢ and S40¢ and XX and coil 37 will be deenergized. Under these conditions current passes from conductor 174A via switch 305, conductors 308, 276 (including then closed switch 36) and 229, switch 230, conductor 231, switch 232, conductor 233, switch 234, conductor 235, switch 236, conductor 241, switch 242, conductor 252, switch 253, conductor 64J, coil 340 of relay 20X to return 66B energizing relay 20X and closing its switches 330 and 331. Now current can pass from conductor 174A via conductor 337 to switch 231, conductors 338, 339, and 256, switch 257, conductor 258, switch 264, conductors 263, 261 (including then closed switch 261A), 64I, 204 including coil of relay S50¢ to return 66B energizing relay S50¢ and at the same time current from conductor 337 passes via switch 330 to conductors 208A, 211, 64F, and 201 including coil of relay S20¢ to return 66B energizing relay S20¢ so that switch 70C now in contact with conductor 70D and switch 70L in contact with conductor 197 will as previously explained establish a circuit through the lamp 70 to indicate seventy cents.

After the quarter passes the switch 315, the coils 311, 317, 180, 310, 309, relays 5X and XX, coils 346 and 347 will be deenergized, but relays S20¢ and T20 (energized as a result of energizing S20¢ as previously explained in connection with the second dime) and relays S50¢ and T50 (energized as a result of energizing S50¢ as previously explained in connection with the fifth dime) will remain energized and coil 37 will be energized to open switch 36 to prepare for the next coin.

The above described apparatus may be used in conjunction with any coin sorter to which the coin controlled switches heretofore mentioned can be applied. For example, it may be used with the coin sorting and counting machine shown and described in the application of that name of Arnold R. Buchholz, Serial No. 409,598, filed February 11, 1954, in which the counter operated switches therein shown may be the switches 54, 176, 315, 322, and 325 of this application.

Figures 10, 12:
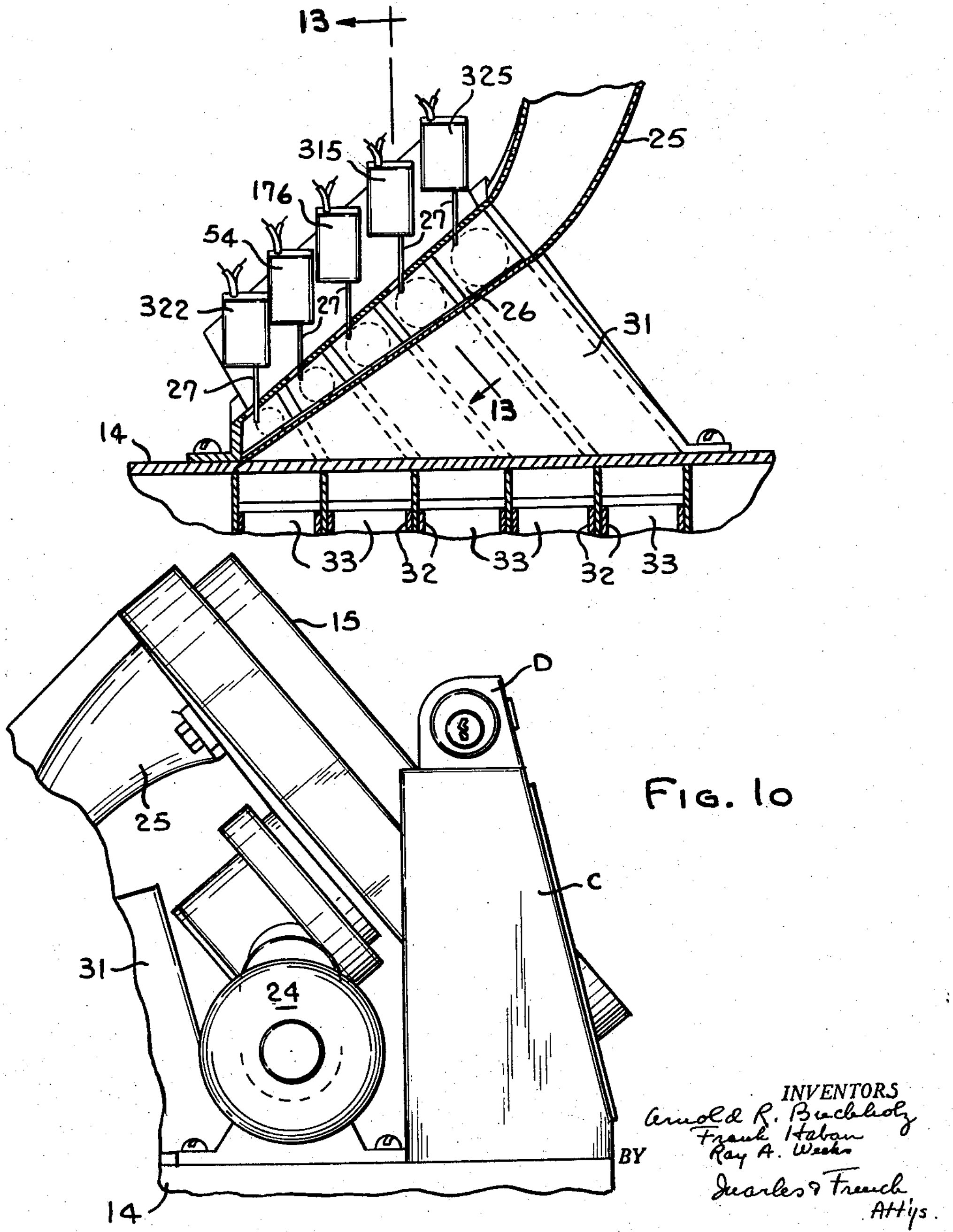
FIG. 10 is a side elevation view of the apparatus.
FIG. 12 is a vertical sectional view taken on the line 12—12 of FIG. 9.
Figure 11:
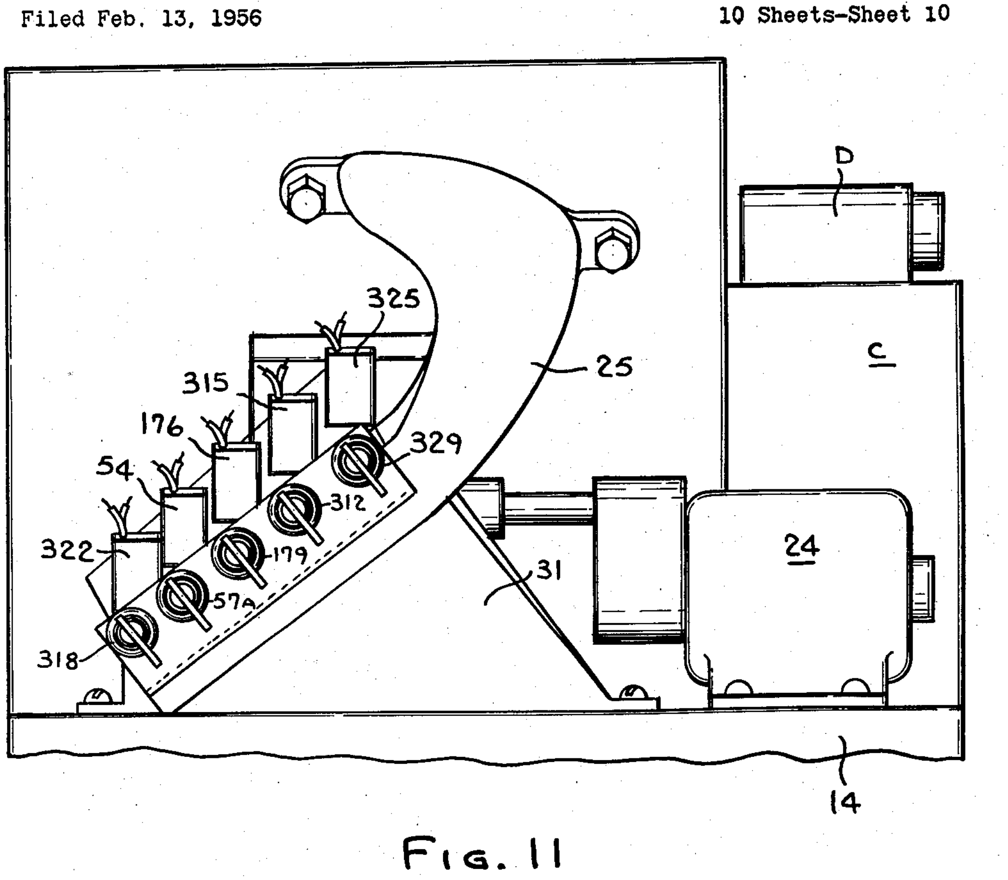
FIG. 11 is a rear elevation view looking along the line 11—11 of FIG. 9.
Figure 13:
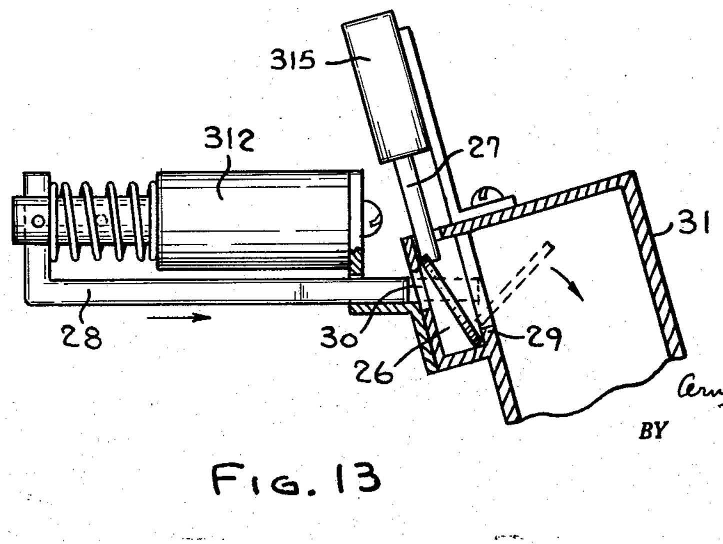
FIG. 13 is a vertical sectional view taken on the broken line 13—13 of FIG. 12.

As previously noted, FIGS. 8 to 13 show a simplified form of sorter mechanism embodying a housing 14 on which a housing C for computer parts and the dollar counter D is mounted, said housing having an inclined top provided with a ring 15 forming a temporary hopper 16 having an annular bottom plate 17 provided with an outlet opening 18 and a scalloped disk 19 rotatably mounted over said bottom plate and secured to a centrally disposed shaft 20 journalled in bearings 21 in the housing and carrying a worm wheel 22 meshing with a worm 23 on an extension of the armature shaft of an electric motor 24. A chute structure 25 of the form shown in FIGS. 8, 9, and 11 connects at its upper end with the passage 18 in the hopper bottom so that as the coins of different denominations are carried up one at a time by the scallops of the disk 19 and drop down into said passage, they will be turned on edge as shown in FIG. 13 as they pass into a sorter section 26 shown in detail in FIGS. 12 and 13.

The sorter section is a chute structure of gradually decreasing width from its entrance end to its lower end along which the coins in edgewise disposition may roll until they are stopped because of the narrower depth of the chute, the positions which the coins of different denominations take during sorting being indicated in dotted lines in FIG. 12. Just before the coin of any denomination can come to a stop, it contacts and moves the actuator 27 of an electric switch. Thus the half dollar moves its actuator to operate the switch 325, the quarter moves its actuator to operate the switch 315, the nickel moves its actuator to operate the switch 176, the penny moves its actuator to operate the switch 54 and the dime moves its actuator to operate the switch 315. The showing of FIG. 12 is purely to facilitate description and is not an actual showing of the coins during operation of the device since the elevator or disk 19 is so timed that only one coin is in the sorter section at any one time.

As the coins actuate their respective switches 325, 315, 176, 54, and 315, their amounts are totaled by the apparatus previously described and simultaneously with the operation of any one of these switches closing the computer circuit, a solenoid having its energizing coil in this circuit and having a pusher or kick out spring returned plunger 28 is operated. These solenoids appear on the wiring diagram as 57A for the penny, 179 for the nickel, 312 for the quarter, 318 for the dime, and 329 for the half dollar and have been similarly designated in FIGS. 9 and 11.

The inner side of the sorter chute is open except for a low coin guide ledge 29, as shown in FIG. 13, so that when the pusher 28 working through an opening 30 in the chute strikes the upper part of the flat side of a sorted coin, it topples it over the ledge 29 into a coin receiving section 31 which is provided with a series of open top drawers 32 forming coin compartments 33.

Thus the coins are expeditiously sorted, and the coins of each denomination delivered to separate receptacles, and as they are sorted, operate the switches which set the computer into operation to register their value.

We desire it to be understood that this invention is not to be limited to the details of construction herein described except in so far as such limitations are included in the appended claims.

What we claim as our invention is:

1. In a coin value computer for coin sorting machines, the combination with digit coin value indicators 0 to 9 in increments of one cent, tens coin value indicators 0 to 90 in increments of ten cents, of means for controlling said indicators comprising electrically operated relays S1¢, S2¢, S3¢, S4¢, and S5¢ for controlling said digit indicators, each of said digit control relays being separately operable to control the digit indicators 1 to 5 and the relay S5¢ being operable in conjunction with the selective operation of relays S1¢, S¢2, S3¢, and S4¢ to control the indicators 6 to 9, a circuit closure operable by a cent, a circuit closure operable by a nickel, electrical circuits including relays and switches controlled thereby controlled by said circuit closures for controlling said relays S1¢, S2¢, S3¢, S4¢, and S5¢ to register the value of said coins up to nine cents passing said closures, electrically operated relays S10¢, S20¢, S30¢, S40¢, and S50¢ for controlling said tens indicators, each of said tens control relays being separately operable to control the tens indicators 10 to 50 and the relay S50¢ being operable in conjunction with the selective operation of relays S10¢, S20¢, S30¢, and S40¢ to control the indicators 60 to 90, a circuit closure operable by a dime, a circuit closure operable by a quarter, a circuit closure operable by fifty cents, electrical circuits including relays and switches controlled by said last three named circuit closures for controlling said relays S10¢, S20¢, S30¢, S40¢, and S50¢ and the S5¢ digit relay to register the value of dimes, quarters, and half dollars passing said closures, said first named electrical circuits including a carry over circuit to control the relay S10¢ when the digit indicators reach a value of ten cents or greater, said last named electrical circuits including a carry back circuit to control the relay S5¢ when the quarter closure is operated.

2. In a coin value computer for coin sorting machines, the combination with digit coin value indicators 0 to 9, in increments of one cent, tens coin value indicators 0 to 90, in increments of ten cents, of means for controlling said indicators comprising electrically operated relays S1¢, S2¢, S3¢, S4¢, and S5¢ for controlling said digit indicators, each of said digit control relays being separately operable to respectively control the digit indicators 1 to 5 and the relay S5¢ being operable in conjunction with the selective operation of relays S1¢, S2¢, S3¢, and S4¢ to control the indicators 6 to 9, a circuit closure operable by a cent, a circuit closure operable by a nickel, electrical circuits including relays and switches controlled thereby and controlled by said circuit closures for controlling said relays S1¢, S2¢, S3¢, S4¢, and S5¢ to register the value of said coins up to nine cents passing said closures, electrically operated relays S10¢, S20¢, S30¢, S40¢, and S50¢ for controlling said tens indicators, each of said tens control relays being separately operable to respectively control the tens indicators 10 to 50 and the relay S50¢ being operable in conjunction with the selective operation of relays S10¢, S20¢, S30¢, and S40¢ to control the indicators 60 to 90, a circuit closure operable by a dime, a circuit closure operable by a quarter, a circuit closure operable by fifty cents, electrical circuits including relays and switches controlled by said last three named circuit closures for controlling said relays S10¢, S20¢, S30¢, S40¢, and S50¢ and the digit relay S5¢ to register the value of dimes, quarters, and half dollars passing said closures, said first named electrical circuits including a carry over circuit to control relay S10¢ when the digit indicators reach a value of ten cents or greater, said last named electrical circuits including a carry back circuit to control the relay S5¢ when the quarter closure is operated, a dollar counter, and an electrical operating circuit to said counter operable when the coins value amount of said indicators reaches or exceeds a dollar value.

3. In a coin value computer for coin sorting machines and including electric switch means, the combination of a digit section having electric relay operated means controlled by a penny or a nickel arranged to operate said switch means to register its value from 1 to 9 cents, a tens section having relay operated means controlled by the cooperation of said switch means and a quarter, dime, or half dollar to register its value in summation with the digit section for the quarter, and means for transferring a five value count from the digit section in summation to the tens section when said count will effect a register of a tens or greater count value.

4. In a coin value computer for coin sorting machines and including electric switch means, the combination of a digit section having electric relay operated means controlled by a penny or a nickel arranged to operate said switch means to register its value from 1 to 9 cents, a tens section having relay operated means controlled by a quarter, dime, or half dollar to register its value in summation with the digit section for the quarter, a dollar counter, and means for operating said counter when a ten value count in the tens section will effect a register of a dollar or more count value.

5. In a coin value computer for coin sorting machines, the combination with digit value indicators 0 to 9, in increments of one cent, tens coin value indicators 0 to 90, in increments of ten cents, of means for controlling said indicators comprising electrically operated relays S1¢, S2¢, S3¢, S4¢, and S5¢ for controlling said digit indicators, each of said digit control relays being separately operable to respectively control the digit indicators 1 to 5 and the relays S5¢ being operable in conjunction with the selective operation of relays S1¢, S2¢, S3¢, and S4¢ to control the indicators 6 to 9, a circuit closure operable by a cent, a circuit closure operatable by a nickel, electrical circuits including relays and switches controlled thereby and controlled by said circuit closures for controlling said relays S1¢, S2¢, S3¢, S4¢, and S5¢ to register the value of coins up to nine cents passing said closures, electrically operated relays S10¢, S20¢, S30¢, S40¢, and S50¢ for controlling said tens indicators, a circuit closure operable by a dime, a circuit closure operable by fifty cents, electrical circuits including relays and switches controlled by said last named circuit closures for controlling said relays S10¢, S20¢, S30¢, S40¢, and S50¢ to register the value of dimes and half dollars passing said closures, a circuit closure operable by a quarter, and relays and switches controlled by said last named closure for controlling the relays S5¢ and S20¢ to register the value of the quarters passing said quarter operated circuit closure.

6. In a coin value computer for coin sorting machines, the combination with digit coin value indicators 0 to 9 in increments of one cent, tens coin value indicators 0 to 90 in increments of ten cents, of means for controlling said indicators comprising electrically operated relays S1¢, S2¢, S3¢ S4¢, and S5¢ for controlling said digit indicators, each of said digit control relays being separately operable to control the digit indicators 1 to 5 and the relay S5¢ being operable in conjunction with the selective operation of relays S1¢, S2¢, S3¢, and S4¢ to control the indicators 6 to 9, a circuit closure operable by a cent, a circuit closure operable by a nickel, electrical circuits including relays and switches controlled thereby controlled by said circuit closures for controlling said relays S1¢, S2¢, S3¢, S4¢, and S5¢ to register the value of said coins up to nine cents passing said closures, electrically operated relays S10¢, S20¢, S30¢, S40¢, and S50¢ for controlling said tens indicators, each of said tens control relays being separately operable to control the tens indicators 10 to 50 and the relay S50¢ being operable in conjunction with the selective operation of relays S10¢, S20¢, S30¢, and S40¢ to control the indicators 60 to 90, a circuit closure operable by a dime, a circuit closure operable by a quarter, a circuit closure operable by fifty cents, electrical circuits including relays and switches controlled by said last three named circuit closures for controlling said relays S10¢, S20¢, S30¢ S40¢, and the S5¢ digit relay to register the value of dimes, quarters and half dollars passing said closures, said first named electrical circuits including a carry over circuit to control the relay S10¢ when the digit indicators reach a value of ten cents or greater, said last named electrical circuits including a carry back circuit to control the relay S5¢ when the quarter closure is operated, a circuit including a relay operated switch to control the relay S10¢ when the amount registered is between thirty-five and thirty-nine cents and the quarter closure is operated, and a circuit including a relay operated switch to control the relay S20¢ when the amount registered is between 45 to 49 cents and the quarter closure is operated.

References Cited in the file of this patent

UNITED STATES PATENTS

| | | |
|---|---|---|
| 2,237,132 | Christensen | Apr. 1, 1941 |
| 2,523,516 | Potter | Sept. 26, 1950 |
| 2,540,063 | Victoreen | Jan. 30, 1951 |
| 2,563,041 | Johnston | Aug. 7, 1951 |
| 2,594,422 | Gordon | Apr. 29, 1952 |
| 2,625,328 | Cesareo | Jan. 13, 1953 |
| 2,646,805 | Anderson | July 28, 1953 |
| 2,663,398 | Skillman | Dec. 22, 1953 |
| 2,675,007 | Young et al. | Apr. 13, 1954 |
| 2,699,290 | Hoppe | Jan. 11, 1955 |
| 2,708,996 | Skillman | May 24, 1955 |
| 2,804,266 | Dexter et al. | Aug. 27, 1957 |
| 2,814,441 | Chaimowicz | Nov. 26, 1957 |
| 2,828,073 | Fennerty | Mar. 25, 1958 |
| 2,895,583 | Lackey | July 21, 1959 |

OTHER REFERENCES

"The Design of Switching Circuits"; Keister, Ritchie and Washburn; D. Van Nostrand Co.; 1951; pp. 6 and 202 relied upon.

UNITED STATES PATENT OFFICE

CERTIFICATE OF CORRECTION

Patent No. 3,016,191 January 9, 1962

Arnold R. Buchholz et al.

It is hereby certified that error appears in the above numbered patent requiring correction and that the said Letters Patent should read as corrected below.

Column 3, line 47, for "70S" read -- 70C --; line 58, after "energize" insert -- relay --; column 7, line 16, for "21" read -- 121 --; line 62, for "switches" read -- switch --; column 8, line 54, for "conduct" read -- contact --; column 10, line 74, for "TL" read -- T5 --.

Signed and sealed this 1st day of May 1962.

(SEAL)
Attest:

ERNEST W. SWIDER
Attesting Officer

DAVID L. LADD
Commissioner of Patents